(12) United States Patent
Stilborn et al.

(10) Patent No.: US 6,391,348 B1
(45) Date of Patent: May 21, 2002

(54) METHOD OF REDUCING CHOLESTEROL IN EGGS

(75) Inventors: Heather L. Stilborn, Des Moines; Roger C. Crum, West Des Moines; David W. Rice, Ankeny; Court A. Saunders, Clive; Mark A. Hinds, Minburn; David S. Ertl, Waukee; Larry R. Beach, Des Moines, all of IA (US); William Edward Huff, Fayetteville, AR (US); Roger A. Kleese, Brooklyn Park, MN (US)

(73) Assignees: Pioneer Hi-Bred International, Inc., Des Moines, IA (US); The United States of America as represented by the Department of Agriculture, Washington, DC (US)

( * ) Notice: Subject to any disclaimer, the term of this patent is extended or adjusted under 35 U.S.C. 154(b) by 0 days.

(21) Appl. No.: 09/443,797

(22) Filed: Nov. 19, 1999

Related U.S. Application Data

(60) Provisional application No. 60/109,414, filed on Nov. 20, 1998, and provisional application No. 60/137,662, filed on Jun. 4, 1999.

(51) Int. Cl.$^7$ .............................. A23K 1/16; A23K 1/18
(52) U.S. Cl. .......................... 426/2; 426/623; 426/630; 426/635; 426/636; 426/807; 119/6.8
(58) Field of Search ........................... 426/2, 547, 623, 426/630, 635, 636, 807, 614; 119/6.8

(56) References Cited

U.S. PATENT DOCUMENTS

| | | | |
|---|---|---|---|
| 4,197,293 | A | 4/1980 | Klein |
| 4,826,692 | A | 5/1989 | Hofmeister |
| 5,689,054 | A | 11/1997 | Raboy |
| 5,780,095 | A | 7/1998 | Jackeschky |
| 6,316,041 | B1 | 11/2001 | Stock et al. |

FOREIGN PATENT DOCUMENTS

| | | | |
|---|---|---|---|
| GB | 2217173 | 10/1989 | |
| JP | 0707908 A | * 3/1995 | ............ A23K/1/16 |
| JP | 07079708 | 3/1995 | |
| WO | WO 99/02668 | 1/1999 | |

OTHER PUBLICATIONS

Dotti, et al., "Inhibiting Effect of Inositol on Serum Cholesterol and Phospho–Lipids Following Cholesterol Feeding in Rabbits", *Proc. Soc. Expl. Biol. Med.*, 1951, 78:165–167.

Herrmann, "Inositol Decholesterization in Old Hens", *Proc. Soc. Expl. Biol. Med.*, 1946, 63:436–438.

Ridout, et al., "Lipotropic Factors and the Fatty Liver Produced by Feeding Cholestrol", *Biochemical Journal*, 1946, 40:494–499.

ERTL, et al., Breeding Experiences with Low Phytate Mutants, Illinois Corn Breeder's School, University of Illinois at Urbana–Champaign, Mar. 1–2, 1999, pp. 117–128.

Szkudelski, et al., Phytic Acid Affects Lipid Metabolism In The Rat, *J. of Animal and Feed Science*, 1998, pp. 429–436, vol. 7.

Mendoza, et al., Effect of Genetically Modified, Low–Phytic Acid Maize on Absorption of Iron from Tortillas, *Am. J. Clin. Nutr.* 1998, pp. 1123–1127, vol. 68.

Huff, et al., Reducing Inorganic Phophorus In Broiler Diets With High Available Phosphorus Corn and Phytase Without Affecting Broiler Performance Or Health, *Abstracts* 1998, Southern Poultry Science Meeting Jan. 19–20, 1998.

Raboy, et al., Breeding Corn For Improved Nutritional Value and Reduced Environmental Impact, *Report of Fifty–Second Annual Corn & Sorghum Research Conference*, Dec. 10–11, 1997, pp. 271–282, Publication No. 52.

Raboy, Mutant Corn Has Low Phytic Acid, *Agricultural Research*, Dec. 1996, pp. 12–14.

ERTL, et al., Plant Genetic Approaches to Phosphorus Management in Agricultural Production, *AgronomyAbstracts* 1996 *Annual Meetings*, Nov. 3–8, 1996, p. 276.

ERTL, Genetic Improvement of the Feed Value in Corn and Oilseeds, Arkansas National Conference, Sep. 12–14, 1995, pp. 52–56.

Katayama, Effect of Dietary Sodium Phytate on the Hepatic and Serum Levels of Lipids and on the Hepatic Activities of NADPH–generating Enzymes in Rats Fed on Sucrose, *Biosci. Biotech. Biochem*, 1995, vol. 59(6), pp. 1159–1160.

Young, et al., Is There a Lethal Threshold for Genetic Reductions in Corn Kernel Phytic Acid?, *American Society of Agronomy– Crop Science Division*, Nov. 13–18, 1994, Published by American Society of Agronomy.

ERTL, Selecting and Breeding Corn Hybrids for Nutritional Properties, Eastern Nutrition Conference, Apr. 19–20, 1994, pp. 11–20.

Katayama, Effect of Dietary Addition of myo–Inositol on Lipid Metabolism in Rats Fed Sucrose or Corn Starch, *Pergamon*, Jan. 6, 1994, pp. 699–706.

Jariwalla, et al., Lowering of Serum Cholesterol and Triglycerides and Modulation of Divalent Cations by Dietary Phytate, *J. Applied Nutrition*, 1990, pp. 18–28, vol. 42, No. 1.

"Nutrient Requirements of Poultry", *Nutrient Requirements of Domestic Animals*, 1994, p. 62, National Research Council.

"Animal Agriculture: The Nutrition–Environment Relationship", *American Feed Industry Association*, Mar. 1998, pp. 1–24.

(List continued on next page.)

Primary Examiner—Milton I. Cano
Assistant Examiner—Robert Madsen
(74) *Attorney, Agent, or Firm*—Alston & Bird LLP

(57) ABSTRACT

The present invention provides a method of reducing cholesterol in animals and food products derived from such animals. The method includes feeding to the animals a low phytate food source so that the phytate phosphorus intake of the animal is reduced.

55 Claims, No Drawings

OTHER PUBLICATIONS

Lansberg, et al., "The effect of Fiberform®, a low–phytate wheat fibre, on plasma lipids and blood pressure of women with familial hypercholesterolaemia", *J. Int. Med.*, 1994, pp. 477–478, vol. 236.

Matsuo, "Acceleration of Sterol Excretion, Little Meteorism, and Less Inhibition of Iron Absorption by *Okara Koji*, A New Foodstuff, in Rats", *Biosci. Biotech. Biochem.*, 1996, pp. 571–574, vol. 60

* cited by examiner

METHOD OF REDUCING CHOLESTEROL IN EGGS

CROSS-REFERENCE TO RELATED APPLICATIONS

This application claims the benefit of U.S. Provisional Nos. 60/109,414, filed Nov. 20, 1998, and 60/137,662, filed Jun. 4, 1999, which are herein incorporated by reference in their entirety.

FIELD OF THE INVENTION

The present invention is directed to the field of animal nutrition. Specifically, the present invention relates to methods of lowering cholesterol levels in animals and food products derived from animals.

BACKGROUND OF THE INVENTION

As public awareness of the dangers of cholesterol has increased in recent years, a number of popular food products have drawn criticism for containing high levels of cholesterol. Eggs are among the maligned products that have suffered because of a public perception that eggs are unhealthy. This perception has led to decreased consumption by consumers. Although improved analytical techniques indicate that previous cholesterol levels attributed to eggs were inflated, there is still substantial consumer concern about egg cholesterol.

As a result of concern over cholesterol intake, a market has developed for egg products having reduced cholesterol. Many of these reduced cholesterol products are produced using additional processing steps, which add substantial cost to the production process. For example, U.S. Patent No. 5,780,095 to Jackeschky describes such a process.

Attempts have also been made to reduce egg cholesterol by modifying the feed given to the egg-producing animals. For example, fibrous feed ingredients, such as barley, and feed additives, such as copper, wood shavings and human cholesterol reducing agents have been utilized in an effort to reduce egg cholesterol. These feeds have proven disadvantageous for a number of reasons. Unlike corn, barley is not a major cereal source in the United States. Thus, the use of barley increases feed costs. Additionally, the production rate of barley may be insufficient to provide a reliable feed supply. Supplementary feed additives, such as copper, increase feed costs and occupy valuable space during the feed mixing process and increased environmental contamination.

There remains a need in the art for a method of lowering the cholesterol levels in animals and eggs without requiring substantial additional process steps or requiring expensive feed additives.

SUMMARY OF THE INVENTION

The present invention provides a method of reducing cholesterol in animals and food products derived from such animals. The method includes feeding the animals a low phytate food source so that the phytate phosphorus intake of the animal is reduced. Supplying a food source containing reduced levels of phytate phosphorus decreases the cholesterol level in the animal and in the food products, such as eggs, produced by the animal.

As used herein, "food source" refers to sources that provide a substantial portion of the nutritional and caloric requirements of the animal, rather than sources, such as mineral supplements, that provide limited nutritional and caloric value. For example, food sources useful in the present invention include soybeans or cereal grains such as corn, sorghum, barley, rye, wheat, rice, millet, processed products derived from the above or mixtures thereof. As used herein, "total animal diet" refers to the complete animal diet, including the food sources described above as well as one or more supplements, such as vitamin and mineral supplements, added fat, medications, and the like.

Specifically, the method of reducing cholesterol comprises providing a food source, wherein the food source comprises less than about 0.30 weight percent phytate phosphorus on an as is basis for soybeans, and less than 0.19 weight percent phytate phosphorus on an as is basis for other food sources. The food source is fed to the animal such that the cholesterol of the animal is reduced. The animal may be any animal that would benefit from a reduction of cholesterol.

A method of producing eggs having reduced cholesterol is also provided. The method includes providing a food source as described above, feeding the food source to an egg-producing animal and collecting at least one egg produced by the animal.

The egg yolks produced by the above method have at least about 8% less total cholesterol as compared to a normal egg yolk, preferably at least 15% less total cholesterol, and most preferably at least 20% less total cholesterol. Similarly, eggs produced by the above process have at least about 6% less low density lipoprotein as compared to a normal egg and preferably at least about 15% less low density lipoprotein.

DETAILED DESCRIPTION OF THE INVENTION

The present invention now will be described more fully hereinafter. However, the present invention may be embodied in many different forms and should not be construed as limited to the embodiments set forth herein; rather, these embodiments are provided so that this disclosure will be thorough and complete, and will fully convey the scope of the invention to those skilled in the art.

The present invention is directed to a method of reducing cholesterol in animals, including non-ruminant and ruminant animals, as well as a method of reducing the cholesterol level in food products derived from such animals, such as meat, milk, and eggs. The term "non ruminant" animals includes, but is not limited to, dogs, cats, humans, swine, and poultry, such as chickens, turkeys, etc. Ruminant animals, such as cattle and sheep, may also benefit from the present invention.

Phosphorus is an essential dietary ingredient for maintaining animal health. The phosphorus content in animal food sources, such as corn, may be divided into two types: available phosphorus and phytate phosphorus. Available phosphorus is that portion of the phosphorus content that may be metabolized and used by animals.

The majority of phosphorus found in many animal food sources, such as corn and soybeans, is in the form of phytate phosphorus. For example, phytate phosphorus accounts for approximately 65% of total phosphorus found in many cereal grains (and more than 80% in corn). Monogastric animals, such as poultry, do not possess the necessary phytase enzymes in quantities that would allow these animals to utilize phytate phosphorus as a source of phosphorus. As a result, the diets of many food-producing animals are supplemented with additional amounts of phosphorus, such as dicalcium phosphate, to encourage normal growth and development. It has been noted that the increased level of phosphorus in the diets of these animals presents phosphorus run-off problems on land fertilized with animal manure.

In order to reduce the phosphorus run-off problem, it is proposed to feed animals food sources which have low amounts of phytate phosphorus either in the form of naturally-occurring low phytate food sources or in the form of specially bred or genetically altered food sources.

A low phytate phosphorus corn mutation has been developed by the USDA and is disclosed in U.S. Pat. No. 5,689,054 to Raboy, which is herein incorporated by reference in its entirety. Additionally, U.S. application Ser. No. 09/118,442, filed on Aug. 17, 1998 and assigned to the same Assignee as the present invention, is directed to the identification and use of genes encoding various enzymes involved in the metabolism of phytate in plants and the use of these genes and mutants thereof to reduce the levels of phytate and/or increase the levels of available phosphorus in food sources. The above-described patent application is herein incorporated by reference in its entirety. Low phytate soybeans are disclosed in WO 98/45448.

Surprisingly, it has been discovered that low phytate phosphorus food sources also serve to reduce cholesterol levels in the animals, as well as in food products produced by the animals. For example, it has been shown that low phytate food sources reduce serum and meat cholesterol levels, as well as cholesterol levels in eggs. This is particularly surprising in light of studies conducted with rats indicating that dietary phytate either reduces serum cholesterol levels or has no effect at all. See Katayama et al., Biosci. Biotech. Biochem., 59 (6), 1159–1160 (1995).

As evidenced by the above-described patent and patent application, phytate phosphorus levels can be altered by breeding or genetic manipulation. The low phytate phosphorus food source used in the present invention has a phytate phosphorus concentration that will depend on the origin of the food source. Low phytate soybeans generally have less than about 0.30 weight percent phytate phosphorus on an as is basis. Low phytate corn generally has less than about 0.19 weight percent phytate phosphorus on an as is basis, preferably less than about 0.17 weight percent, and most preferably less than about 0.15 weight percent.

The total animal diet will generally contain between about 0.10 and about 1.00 weight percent available phosphorus on an as is basis, preferably between about 0.10 and about 0.80 weight percent, more preferably between about 0.20 and about 0.65 weight percent, and most preferably between about 0.20 and about 0.50 weight percent.

The total animal diet will generally contain between about 0.10 and about 1.20 weight percent total phosphorus on an as is basis, preferably between about 0.20 and about 1.00 weight percent total phosphorus, more preferably between about 0.20 and 0.95, and most preferably between about 0.30 and about 0.70 weight percent.

In one embodiment, the low phytate food source of the present invention comprises both a low phytate cereal food source, such as low phytate corn, and a low phytate protein source, such as low phytate full fat soybeans or low phytate soybean meal. The relative amounts of the protein source and the cereal source will vary depending on a number of factors, including the age and type of animal being fed. If a mixture of food sources is used, generally the cereal low phytate food source comprises at least about 30% by weight of the total animal diet, preferably at least about 40%, more preferably at least about 50%. In one embodiment, the cereal low phytate food source comprises about 50% to about 80% of the total animal diet. If a low phytate protein source is used in the food source mixture, generally it comprises at least about 5% of the total animal diet, preferably about 10% to about 55%, more preferably about 15% to about 30%. Processed products derived from cereal grains and/or oil feeds may be present in an amount of from about 1% to about 30% of the total animal diet. Examples of such processed products include corn gluten meal, corn gluten feed, canola meal and the like.

In another embodiment of the present invention, a reduction in cholesterol level is achieved by using a food source having both a decreased phytate phosphorus concentration and increased oil concentration. The oil concentration is increased by an amount sufficient to reduce the cholesterol level of an animal fed the food source as a substantial part of a total animal diet. In a preferred embodiment, the oil concentration of the food source, such as corn, is increased by adding at least one fatty acid, including, but not limited to, palmitic acid, palmitoleic acid, stearic acid, oleic acid, linoleic acid, linolenic acid, arachidic acid, eicosenoic acid, behenic acid, and lignoceric acid. Preferably, the oil content of the low phytate food source is about 5% to about 15% by dry weight, more preferably about 6% to about 10%, most preferably about 7 to about 8%.

The method of the present invention includes providing a food source containing decreased levels of phytate phosphorus as described above and feeding that food source to the animal. The method of feeding may be any method known in the art.

The present invention is also directed to an egg having reduced cholesterol as compared to a normal egg. In this regard, a "normal egg" is defined as an egg produced by an animal fed conventional food sources containing conventional forms and amounts of phosphorus. By reduced cholesterol is meant lower cholesterol concentration. The actual amount of cholesterol in a normal egg varies with the age and diet of the egg-producing animal. As an example, on day 28 of the study described in Example 1, the average total cholesterol level of the egg yolks produced by the control group of animals being fed conventional corn feed was approximately 1.158 grams/100 grams of yolk. Additionally, in the same study, the control group of animals produced an average egg yolk total cholesterol level of approximately 1.494 grams/100 grams of yolk on day 140 of the study.

The present invention provides a method of reducing total cholesterol in an egg by about 5 to about 50 percent as compared to a normal egg. In some embodiments, the range of total cholesterol reduction is about 5 to about 30 percent or 5 to about 25 percent. For example, in the study described in Example 1, the eggs collected from the animals being fed the low phytate food source had a reduced total cholesterol level of at least about 8% below the egg total cholesterol level of the control group on the same day, preferably at least about 13% as much, more preferably at least about 15% and even as much as about 20% or 23% less total cholesterol. Further, the eggs collected from the animals fed the low phytate food sources exhibited a low density lipoprotein of at least about 4% or about 6% below that of the normal eggs collected from the control group, and as much as about 15% or 22% or more below that of the normal eggs in the control group.

These reductions in cholesterol levels are achieved using the method of the present invention without further post-laying processing steps and without expensive feed additives. As a result, the term egg, as used herein, is intended to mean an egg product substantially free of post-laying treatment or processing designed to reduce the cholesterol level of the egg.

Experimental

EXAMPLE 1

Four hundred and seventy pullets (20 weeks of age) of a commercial strain were obtained and placed on a common preconditioning ration containing yellow dent corn. Throughout the examples, yellow dent corn is the control feed. This was formulated using breeder-recommended nutrient requirements and fed to the pullets for 1 week, in order for the birds to acclimate. At 21 weeks of age, hens within a 1500–1900 gram weight range, were randomly selected, wingbanded and placed on experimental treatments.

Five groups of hens were fed yellow dent corn (YDC) or low phytate corn (LPC) and/or varying levels of available P. Each treatment group was fed to 90 laying hens randomly assigned to 15 replicates per treatment. Each replicate (cage) contained six hens. Individual free-standing cage dimensions were 18" wide×26" long×18" high. Each cage row contained 4 cages×3 tiers high. Four hundred and fifty hens were utilized in the study. Hens were observed daily for signs of production and/or behavior changes. Daily temperature was recorded, with a temperature goal of 75° F.

The yellow dent corn used in the study was genetically similar to the low phytate corn, with the exception of the phytate phosphorus content and available phosphorus content. All rations (mash form) were balanced with equal/or similar nutrient contents, except for phosphorus (dietary calcium and Vitamin D3 remained constant), in order to meet or exceed the NRC (1994) nutrient recommendations and simulate commercial conditions and breeder recommendations. Feed and water were supplied ad-libitum.

Five ration types were formulated: Preconditioning (Day -7-0); Layer Phase 1 (Day 0–28), Layer Phase 2 (Day 29–56); Layer Phase 3 (Day 57–84); Layer Phase 4 (Day 85–112) and Layer Phase 5 (Day 113–140). The five treatments fed: 1) YDC (control)/0.47% available P; 2) low phytate corn/0.47% available P; 3) low phytate corn/0.40% available P; 4) low phytate corn/0.33% available P and 5) low phytate corn/0.25% available P. Nutrient requirements were adjusted for increasing feed intake that occurred with each changing layer phase. Tables 1–5 show the nutrient levels of all five food source treatments for each layer phase of the study.

TABLE 1

Composition of test diets for Phase 1 (98 grams/hen/day)

| Ingredients | YDC47 (Control) 0.47% Av. P. | Low Phytate Corn Treatments | | | |
|---|---|---|---|---|---|
| | | LPC47 0.47% Av. P. | LPC40 0.40% Av. P. | LPC33 0.33% Av. P. | LPC26 0.26% Av. P. |
| Yellow Dent Corn (%) | 61.54 | | | | |
| Low Phytate Corn (%) | | 61.68 | 61.68 | 61.67 | 61.66 |
| Soybean meal - 48 (%) | 24.99 | 25.15 | 25.14 | 25.14 | 25.13 |
| Rice Hulls (%) | 0.84 | 0.69 | 0.85 | 1.00 | 1.16 |
| An/Veg Fat (%) | | | 1.00 | | |
| Dicalcium Phosphate (%) | 1.87 | 1.50 | 1.15 | 0.80 | 0.45 |
| Limestone (%) | 9.10 | 9.32 | 9.53 | 9.74 | 9.96 |
| DL-Methionine (%) | 0.144 | 0.136 | 0.136 | 0.136 | 0.136 |
| L-Lysine HCl (%) | — | — | — | — | — |
| Vitamin Premix (%) | | | 0.025 | | |
| Trace Mineral Mix (%) | | | 0.075 | | |
| Other[A] (%) | | | to 100% | | |
| Calculated and Analyzed Nutrient Composition (As Is Basis) | | | | | |
| Moisture (%) | 10.99 [11.17][B] | 11.50 [11.53] | 11.51 [11.26] | 11.52 [11.42] | 11.53 [11.55] |
| ME (kcal/lb) | {1300}[C] 1300 | 1300 | 1300 | 1300 | 1300 |
| Crude Protein (%) | {17.50} 17.50 [18.54] | 17.50 [18.58] | 17.50 [18.96] | 17.50 [18.88] | 17.50 [18.27] |
| Crude Fat (%) | {3.15} 3.20 [3.16] | 3.40 [3.04] | 3.40 [3.51] | 3.40 [3.67] | 3.40 [4.20] |
| Crude Fiber (%) | 2.06 [3.10] | 2.04 [2.95] | 2.10 [2.95] | 2.16 [3.20] | 2.22 [2.90] |
| Ash (%) | 12.66 [10.78] | 12.69 [12.50] | 12.61 [11.71] | 12.52 [10.81] | 12.44 [12.12] |
| Calcium (%) | {3.95} 3.97 [3.48] | 3.95 [3.81] | 3.97 [3.57] | 3.97 [3.44] | 3.97 [3.71] |
| Avail. Phosphorus (%) | 0.47 | 0.47 | 0.40 | 0.33 | 0.26 |
| Total Phosphorus (%) | 0.69 [0.62] | 0.63 [0.75] | 0.56 [0.65] | 0.49 [0.46] | 0.42 [0.42] |
| Phytate Phos. (%) | 0.22 | 0.17 | 0.17 | 0.17 | 0.17 |
| Sodium (%) | {0.15} 0.15 | 0.15 | 0.15 | 0.15 | 0.15 |
| Arginine (%) | {1.00} 1.13 [1.05] | 1.15 [1.09] | 1.14 [1.09] | 1.14 [1.11] | 1.14 [1.06] |
| Cystine (%) | 0.29 [0.26] | 0.29 [0.27] | 0.29 [0.28] | 0.29 [0.27] | 0.29 [0.27] |
| Histidine (%) | 0.45 [0.46] | 0.45 [0.49] | 0.45 [0.48] | 0.45 [0.51] | 0.45 [0.47] |
| Isoleucine (%) | 0.80 [0.67] | 0.81 [0.72] | 0.81 [0.71] | 0.81 [0.72] | 0.81 [0.69] |
| Leucine (%) | 1.61 [1.44] | 1.57 [1.58] | 1.57 [1.56] | 1.57 [1.59] | 1.57 [1.54] |
| Lysine (%) | {0.75} 0.91 [0.88] | 0.92 [0.92] | 0.92 [0.92] | 0.92 [0.94] | 0.92 [0.89] |
| Methionine (%) | {0.38} 0.41 [0.38] | 0.41 [0.38] | 0.41 [0.38] | 0.41 [0.37] | 0.41 [0.36] |
| MET + CYS (%) | {0.63} 0.70 [0.64] | 0.70 [0.65] | 0.70 [0.66] | 0.70 [0.64] | 0.70 [0.63] |
| Phenylalanine (%) | 0.92 [0.81] | 0.92 [0.86] | 0.92 [0.85] | 0.92 [0.87] | 0.2 [0.84] |
| Tyrosine (%) | 0.33 [0.40] | 0.31 [0.42] | 0.31 [0.42] | 0.31 [0.42] | 0.31 [0.41] |
| Threonine (%) | 0.67 [0.69] | 0.67 [0.73] | 0.67 [0.72] | 0.67 [0.72] | 0.67 [0.70] |
| Tryptophan (%) | {0.19} 0.22 [0.22] | 0.23 [0.23] | 0.23 [0.22] | 0.23 [0.24] | 0.23 [0.22] |

TABLE 1-continued

Composition of test diets for Phase 1 (98 grams/hen/day)

| Ingredients | | YDC47 (Control) 0.47% Av. P. | LPC47 0.47% Av. P. | LPC40 0.40% Av. P. | LPC33 0.33% Av. P. | LPC26 0.26% Av. P. |
|---|---|---|---|---|---|---|
| Valine (%) | | 0.89 [0.77] | 0.90 [0.83] | 0.90 [0.82] | 0.90 [0.83] | 0.90 [0.79] |
| C18:2 (%) | {1.58} | 1.89 | 1.89 | 1.89 | 1.89 | 1.89 |

[A]Other = Choline chloride and salt added to help meet requirements for choline and sodium.
[B]Number in [ ] brackets represent actual analyzed total values.
[C]Numbers in { } represent requirement specified for feed formulation purposes, with the exception of lysine, methionine and Met + Cys which were specified on a digestible basis. The calculated dietary nutrient content represents total level and not digestible.

TABLE 2

Composition of test diets for Phase 2 (105 grams/hen/day)

| Ingredients | | YDC47 (Control) 0.47% Av. P. | LPC47 0.47% Av. P. | LPC40 0.40% Av. P. | LPC33 0.33% Av. P. | LPC26 0.26% Av. P. |
|---|---|---|---|---|---|---|
| Yellow Dent Corn (%) | | 63.08 | | | | |
| Low Phytate Corn (%) | | | 63.06 | 63.23 | 63.40 | 63.57 |
| Soybean meal - 48 (%) | | 22.58 | 22.77 | 22.74 | 22.70 | 22.67 |
| Rice Hulls (%) | | | | 2.00 | | |
| An/Veg Fat (%) | | | | 1.00 | | |
| Dicalcium Phosphate (%) | | 1.75 | 1.37 | 1.02 | 0.66 | 0.31 |
| Limestone (%) | | 8.92 | 9.15 | 9.36 | 9.58 | 9.79 |
| DL-Methionine (%) | | 0.127 | 0.119 | 0.119 | 0.119 | 0.119 |
| L-Lysine HCl (%) | | — | — | — | — | — |
| Vitamin Premix (%) | | | | 0.025 | | |
| Trace Mineral Mix (%) | | | | 0.075 | | |
| Other[A] (%) | | | | to 100% | | |
| Calculated and Analyzed Nutrient Composition (As Is Basis) | | | | | | |
| Moisture (%) | | 11.06 [10.66][B] | 11.58 [11.12] | 11.59 [11.14] | 11.61 [11.37] | 11.62 [10.96] |
| ME (kcal/lb) | {1290}[C] | 1299 | 1297 | 1300 | 1302 | 1304 |
| Crude Protein (%) | {16.50} | 16.50 [17.81] | 16.50 [16.40] | 16.50 [17.29] | 16.50 [17.76] | 16.50 [17.05] |
| Crude Fat (%) | {2.95} | 3.33 [3.68] | 3.45 [3.61] | 3.45 [3.52] | 3.46 [3.08] | 3.46 [3.48] |
| Crude Fiber (%) | | 2.48 [3.25] | 2.52 [3.25] | 2.52 [2.85] | 2.52 [3.20] | 2.52 [2.95] |
| Ash (%) | | 12.25 [11.97] | 12.29 [11.68] | 12.20 [13.99] | 12.12 [10.65] | 12.04 [12.99] |
| Calcium (%) | {3.85} | 3.87 [3.36] | 3.87 [3.43] | 3.87 [4.45] | 3.87 [3.30] | 3.87 [4.38] |
| Avail. Phosphorus (%) | | 0.44 | 0.44 | 0.37 | 0.30 | 0.23 |
| Total Phosphorus (%) | | 0.65 [0.60] | 0.60 [0.59] | 0.53 [0.66] | 0.46 [0.46] | 0.39 [0.40] |
| Phytate Phos. (%) | | 0.21 | 0.16 | 0.16 | 0.16 | 0.16 |
| Sodium (%) | {0.15} | 0.17 | 0.17 | 0.17 | 0.17 | 0.17 |
| Arginine (%) | {0.93} | 1.04 [1.07] | 1.06 [0.96] | 1.06 [0.96] | 1.06 [0.98] | 1.06 [0.93] |
| Cystine (%) | | 0.27 [0.27] | 0.27 [0.25] | 0.27 [0.22] | 0.27 [0.25] | 0.27 [0.24] |
| Histidine (%) | | 0.42 [0.49] | 0.43 [0.44] | 0.43 [0.45] | 0.43 [0.46] | 0.43 [0.44] |
| Isoleucine (%) | | 0.75 [0.69] | 0.76 [0.64] | 0.76 [0.63] | 0.76 [0.65] | 0.76 [0.62] |
| Leucine (%) | | 1.54 [1.52] | 1.50 [1.46] | 1.50 [1.45] | 1.50 [1.50] | 1.50 [1.42] |
| Lysine (%) | {0.70} | 0.84 [0.89] | 0.85 [0.81] | 0.85 [0.81] | 0.85 [0.82] | 0.85 [0.78] |
| Methionine (%) | {0.34} | 0.38 [0.38] | 0.38 [0.37] | 0.38 [0.33] | 0.38 [0.35] | 0.38 [0.34] |
| MET + CYS (%) | {0.59} | 0.65 [0.65] | 0.65 [0.62] | 0.65 [0.55] | 0.65 [0.60] | 0.65 [0.58] |
| Phenylalanine (%) | | 0.87 [0.84] | 0.86 [0.78] | 0.86 [0.78] | 0.86 [0.79] | 0.86 [0.75] |
| Tyrosine (%) | | 0.31 [0.40] | 0.30 [0.37] | 0.30 [0.38] | 0.30 [0.38] | 0.30 [0.36] |
| Threonine (%) | {0.61} | 0.63 [0.69] | 0.63 [0.65] | 0.63 [0.64] | 0.63 [0.66] | 0.63 [0.63] |
| Tryptophan (%) | {0.18} | 0.20 [0.21] | 0.21 [0.19] | 0.21 [0.21] | 0.21 [0.21] | 0.21 [0.21] |
| Valine (%) | | 0.83 [0.78] | 0.85 [0.74] | 0.85 [0.74] | 0.85 [0.74] | 0.85 [0.71] |
| C18:2 (%) | {1.47} | 1.92 | 1.92 | 1.92 | 1.92 | 1.93 |

[A]Other = Choline chloride and salt added to help meet requirements for choline and sodium.
[B]Number in [ ] brackets represent actual analyzed total values.
[C]Numbers in { } represent requirement specified for feed formulation purposes, with the exception of lysine, methionine and Met + Cys which were specified on a digestible basis. The calculated dietary nutrient content represents total level and not digestible.

TABLE 3

Composition of test diets for Phase 3 (108 grams/hen/day)

| Ingredients | | YDC47 (Control) 0.47% Av. P. | LPC47 0.47% Av. P. | Low Phytate Corn Treatments LPC40 0.40% Av. P. | LPC33 0.33% Av. P. | LPC26 0.26% Av. P. |
|---|---|---|---|---|---|---|
| Yellow Dent Corn (%) | | 65.30 | | | | |
| Low Phytate Corn (%) | | | 65.34 | 65.44 | 65.13 | 64.81 |
| Soybean meal - 48 (%) | | 20.10 | 20.23 | 20.26 | 20.72 | 21.19 |
| Rice Hulls (%) | | | | 3.00 | | |
| An/Veg Fat (%) | | | | 0.50 | | |
| Dicalcium Phosphate (%) | | 1.62 | 1.23 | 0.88 | 0.52 | 0.17 |
| Limestone (%) | | 8.83 | 9.07 | 9.28 | 9.49 | 9.70 |
| DL-Methionine (%) | | 0.115 | 0.107 | 0.106 | 0.102 | 0.097 |
| L-Lysine HCl (%) | | — | — | | — | — |
| Vitamin Premix (%) | | | | 0.025 | | |
| Trace Mineral Mix (%) | | | | 0.075 | | |
| Other[A] (%) | | | | to 100% | | |
| Calculated and Analyzed Nutrient Composition (As Is Basis) | | | | | | |
| Moisture (%) | | 11.06 [12.08][B] | 11.23 [11.54] | 11.24 [11.39] | 11.25 [11.65] | 11.25 [11.64] |
| ME (kcal/lb) | {1275}[C] | 1290 | 1288 | 1290 | 1290 | 1290 |
| Crude Protein (%) | {15.50} | 15.52 [16.14] | 15.50 [16.58] | 15.53 [16.99] | 15.72 [17.24] | 15.91 [17.06] |
| Crude Fat (%) | {2.80} | 2.90 [2.61] | 3.02 [2.81] | 3.02 [2.84] | 3.01 [2.91] | 3.01 [2.89] |
| Crude Fiber (%) | | 2.85 [3.70] | 2.89 [3.70] | 2.89 [3.80] | 2.90 [3.73] | 2.90 [3.70] |
| Ash (%) | | 11.93 [12.89] | 11.96 [10.66] | 11.88 [12.55] | 11.82 [11.37] | 11.76 [12.52] |
| Calcium (%) | {3.75} | 3.80 [4.04] | 3.80 [3.15] | 3.80 [4.05] | 3.80 [3.42] | 3.80 [3.86] |
| Avail. Phosphorus (%) | | 0.41 | 0.41 | 0.34 | 0.27 | 0.20 |
| Total Phosphorus (%) | | 0.62 [0.68] | 0.56 [0.47] | 0.49 [0.48] | 0.42 [0.43] | 0.35 [0.37] |
| Phytate Phos. (%) | | 0.21 | 0.15 | 0.15 | 0.15 | 0.16 |
| Sodium (%) | {0.15} | 0.17 | 0.17 | 0.17 | 0.17 | 0.17 |
| Arginine (%) | {0.90} | 0.96 [0.89] | 0.98 [0.88] | 0.98 [0.87] | 1.00 [0.90] | 1.01 [0.91] |
| Cystine (%) | | 0.26 [0.24] | 0.26 [0.24] | 0.26 [0.21] | 0.26 [0.22] | 0.26 [0.25] |
| Histidine (%) | | 0.40 [0.41] | 0.40 [0.42] | 0.40 [0.41] | 0.41 [0.43] | 0.41 [0.43] |
| Isoleucine (%) | | 0.69 [0.59] | 0.70 [0.59] | 0.70 [0.58] | 0.71 [0.59] | 0.72 [0.59] |
| Leucine (%) | | 1.47 [1.36] | 1.43 [1.40] | 1.43 [1.38] | 1.44 [1.40] | 1.46 [1.40] |
| Lysine (%) | {0.68} | 0.77 [0.74] | 0.78 [0.73] | 0.78 [0.72] | 0.79 [0.74] | 0.81 [0.75] |
| Methionine (%) | {0.32} | 0.35 [0.34] | 0.35 [0.31] | 0.35 [0.30] | 0.35 [0.29] | 0.335 [0.31] |
| MET + CYS (%) | {0.55} | 0.61 [0.58] | 0.61 [0.55] | 0.61 [0.51] | 0.61 [0.51] | 0.61 [0.56] |
| Phenylalanine (%) | | 0.81 [0.72] | 0.80 [0.73] | 0.80 [0.72] | 0.81 [0.73] | 0.83 [0.74] |
| Tyrosine (%) | | 0.30 [0.35] | 0.29 [0.35] | 0.29 [0.35] | 0.30 [0.35] | 0.29 [0.35] |
| Threonine (%) | {0.56} | 0.58 [0.60] | 0.59 [0.60] | 0.59 [0.59] | 0.60 [0.61] | 0.60 [0.62] |
| Tryptophan (%) | {0.17} | 0.18 [0.20] | 0.19 [0.18] | 0.19 [0.18] | 0.19 [0.16] | 0.20 [0.20] |
| Valine (%) | | 0.77 [0.67] | 0.79 [0.70] | 0.79 [0.68] | 0.80 [0.70] | 0.81 [0.71] |
| C18:2 (%) | {1.40} | 1.83 | 1.83 | 1.83 | 1.83 | 1.82 |

[A]Other = Choline chloride and salt added to help meet requirements for choline and sodium.
[B]Number in [ ] brackets represent actual analyzed total values.
[C]Numbers in { } represent requirement specified for feed formulation purposes, with the exception of lysine, methionine and Met + Cys which were specified on a digestible basis. The calculated dietary nutrient content represents total level and not digestible.

TABLE 4

Composition of test diets for Phase 4 (115 grams/hen/day)

| Ingredients | YDC47 (Control) 0.47% Av. P. | LPC47 0.47% Av. P. | Low Phytate Corn Treatments LPC40 0.40% Av. P. | LPC33 0.33% Av. P. | LPC26 0.26% Av. P. |
|---|---|---|---|---|---|
| Yellow Dent Corn (%) | 69.01 | | | | |
| Low Phytate Corn (%) | | 68.34 | 68.26 | 69.96 | 67.62 |
| Soybean meal - 48 (%) | 17.23 | 17.55 | 17.77 | 18.24 | 18.73 |
| Rice Hulls (%) | 2.45 | | 3.00 | | |
| An/Veg Fat (%) | | | 0.50 | | |
| Dicalcium Phosphate (%) | 1.60 | 1.19 | 0.84 | 0.48 | 0.13 |
| Limestone (%) | 8.52 | 8.77 | 8.98 | 9.19 | 9.40 |
| DL-Methionine (%) | 0.12 | 0.111 | 0.109 | 0.104 | 0.099 |
| L-Lysine HCl (%) | 0.044 | 0.027 | 0.020 | 0.004 | — |
| Vitamin Premix (%) | | | 0.025 | | |
| Trace Mineral Mix (%) | | | 0.075 | | |
| Other[A] (%) | | | to 100% | | |

TABLE 4-continued

Composition of test diets for Phase 4 (115 grams/hen/day)

| Ingredients | YDC47 (Control) 0.47% Av. P. | | Low Phytate Corn Treatments | | | | | | | |
| --- | --- | --- | --- | --- | --- | --- | --- | --- | --- | --- |
| | | | LPC47 0.47% Av. P. | | LPC40 0.40% Av. P. | | LPC33 0.33% Av. P. | | LPC26 0.26% Av. P. | |
| Calculated and Analyzed Nutrient Composition (As Is Basis) | | | | | | | | | | |
| Moisture (%) | | 10.81 | [11.94][B] | 11.36 | [11.41] | 11.37 | [11.50] | 11.37 | [11.30] | 11.37 | [11.42] |
| ME (kcal/lb) | {1278}[C] | 1278 | | 1279 | | 1280 | | 1280 | | 1280 | |
| Crude Protein (%) | {14.50} | 14.50 | [14.70] | 14.50 | [15.89] | 14.59 | [16.02] | 14.77 | [15.83] | 14.97 | [16.34] |
| Crude Fat (%) | {2.68} | 3.00 | [3.54] | 3.11 | [3.63] | 3.11 | [3.48] | 3.10 | [3.42] | 3.09 | [3.64] |
| Crude Fiber (%) | | 2.61 | [3.51] | 2.86 | [3.3] | 2.87 | [3.45] | 2.87 | [3.06] | 2.88 | [3.55] |
| Ash (%) | | 11.48 | [10.67] | 11.51 | [12.18] | 11.44 | [12.13] | 11.38 | [11.35] | 11.31 | [11.05] |
| Calcium (%) | {3.65} | 3.67 | [3.43] | 3.67 | [3.31] | 3.67 | [3.52] | 3.67 | [3.28] | 3.67 | [3.65] |
| Avail. Phosphorus (%) | | 0.40 | | 0.40 | | 0.33 | | 0.26 | | 0.19 | |
| Total Phosphorus (%) | | 0.60 | [0.65] | 0.54 | [0.56] | 0.47 | [0.47] | 0.40 | [0.43] | 0.34 | [0.42] |
| Phytate Phos. (%) | | 0.20 | | 0.14 | | 0.15 | | 0.14 | | 0.15 | |
| Sodium (%) | {0.15} | 0.17 | | 0.17 | | 0.17 | | 0.17 | | 0.17 | |
| Arginine (%) | {0.85} | 0.87 | [0.85] | 0.89 | [[0.90] | 0.90 | [0.95] | 0.91 | [0.87] | 0.93 | [0.89] |
| Cystine (%) | | 0.25 | [0.21] | 0.25 | [0.23] | 0.25 | [0.22] | 0.25 | [0.21] | 0.25 | [0.25] |
| Histidine (%) | | 0.38 | [0.40] | 0.38 | [0.42] | 0.38 | [0.45] | 0.39 | [0.42] | 0.39 | [0.43] |
| Isoleucine (%) | | 0.63 | [0.58] | 0.64 | [0.60] | 0.64 | [0.63] | 0.66 | [0.60] | 0.67 | [0.62] |
| Leucine (%) | | 1.40 | [[1.36] | 1.36 | [1.40] | 1.37 | [1.45] | 1.38 | [1.40] | 1.40 | [1.46] |
| Lysine (%) | {0.64} | 0.72 | [0.72] | 0.72 | [0.75] | 0.72 | [0.79] | 0.72 | [0.72] | 0.74 | [0.73] |
| Methionine (%) | {0.31} | 0.34 | [0.30] | 0.34 | [0.29] | 0.34 | [0.30] | 0.34 | [0.28] | 0.34 | [0.30] |
| MET + CYS (%) | {0.53} | 0.59 | [0.51] | 0.59 | [0.52] | 0.59 | [0.52] | 0.59 | [0.49] | 0.59 | [0.55] |
| Phenylalanine (%) | | 0.75 | [0.70] | 0.74 | [0.73] | 0.75 | [0.76] | 0.76 | [0.72] | 0.77 | [0.75] |
| Tyrosine (%) | | 0.28 | [0.32] | 0.28 | [0.33] | 0.28 | [0.36] | 0.28 | [0.32] | 0.29 | [0.34] |
| Threonine (%) | {0.52} | 0.54 | [0.56] | 0.54 | [0.59] | 0.55 | [0.63] | 0.55 | [0.57] | 0.56 | [0.60] |
| Tryptophan (%) | {0.16} | 0.16 | [0.16] | 0.17 | [0.17] | 0.17 | [0.18] | 0.18 | [0.14] | 0.18 | [0.19] |
| Valine (%) | | 0.71 | [0.68] | 0.73 | [0.71] | 0.73 | [0.74] | 0.75 | [0.70] | 0.76 | [0.72] |
| C18:2 (%) | {1.35} | 1.90 | | 1.89 | | 1.89 | | 1.89 | | 1.88 | |

[A]Other = Choline chloride and salt added to help meet requirements for choline and sodium.
[B]Number in [ ] brackets represent actual analyzed total values.
[C]Numbers in { } represent requirement specified for feed formulation purposes, with the exception of lysine, methionine and Met + Cys which were specified on a digestible basis. The calculated dietary nutrient content represents total level and not digestible.

TABLE 5

Composition of test diets for Phase 5 (118 grams/hen/day)

| Ingredients | YDC47 (Control) 0.47% Av. P. | | Low Phytate Corn Treatments | | | | | | | |
| --- | --- | --- | --- | --- | --- | --- | --- | --- | --- | --- |
| | | | LPC47 0.47% Av. P. | | LPC40 0.40% Av. P. | | LPC33 0.33% Av. P. | | LPC26 0.26% Av. P. | |
| Yellow Dent Corn (%) | 69.84 | | | | | | | | | |
| Low Phytate Corn (%) | | | 69.79 | | 69.75 | | 69.44 | | 69.21 | |
| Soybean meal - 48 (%) | 15.60 | | 15.23 | | 15.42 | | 15.89 | | 16.24 | |
| Rice Hulls (%) | 3.42 | | | | | | 4.00 | | | |
| An/Veg Fat (%) | | | | | | | 0.50 | | | |
| Dicalcium Phosphate (%) | 1.52 | | 1.11 | | 0.75 | | 0.40 | | 0.10 | |
| Limestone (%) | 8.40 | | 8.65 | | 8.86 | | 9.07 | | 9.25 | |
| DL-Methionine (%) | 0.128 | | 0.126 | | 0.124 | | 0.119 | | 0.115 | |
| L-Lysine HCl (%) | 0.079 | | 0.085 | | 0.078 | | 0.062 | | 0.050 | |
| Vitamin Premix (%) | | | | | 0.025 | | | | | |
| Trace Mineral Mix (%) | | | | | 0.075 | | | | | |
| Other[A] (%) | | | | | to 100% | | | | | |
| Calculated and Analyzed Nutrient Composition (As Is Basis) | | | | | | | | | | |
| Moisture (%) | | 10.85 | [11.72][B] | 11.42 | [11.64] | 11.43 | [11.43] | 11.43 | [11.50] | 11.43 | [11.34] |
| ME (kcal/lb) | {1275}[C] | 1275 | | 1279 | | 1280 | | 1280 | | 1280 | |
| Crude Protein (%) | {13.00} | 13.86 | [14.77] | 13.60 | [15.74] | 13.69 | [16.18] | 13.87 | [15.96] | 14.00 | [15.58] |
| Crude Fat (%) | {2.61} | 3.03 | [3.75] | 3.15 | [3.76] | 3.15 | [3.42] | 3.14 | [3.21] | 3.14 | [3.36] |
| Crude Fiber (%) | | 2.96 | [3.30] | 3.22 | [3.38] | 3.22 | [3.44] | 3.23 | [3.06] | 3.24 | [3.24] |
| Ash (%) | | 11.20 | [10.05] | 11.20 | [11.89] | 11.13 | [12.21] | 11.07 | [11.46] | 11.01 | [11.52] |
| Calcium (%) | {3.55} | 3.60 | [3.36] | 3.60 | [3.52] | 3.60 | [3.57] | 3.60 | [3.43] | 3.60 | [3.60] |
| Avail. Phosphorus (%) | | 0.38 | | 0.38 | | 0.31 | | 0.24 | | 0.18 | |
| Total Phosphorus (%) | | 0.58 | [0.56] | 0.51 | [0.59] | 0.44 | [0.46] | 0.38 | [0.41] | 0.32 | [0.33] |
| Phytate Phos. (%) | | 0.20 | | 0.13 | | 0.14 | | 0.14 | | 0.14 | |
| Sodium (%) | {0.15} | 0.17 | | 0.17 | | 0.17 | | 0.17 | | 0.17 | |

TABLE 5-continued

Composition of test diets for Phase 5 (118 grams/hen/day)

| Ingredients | YDC47 (Control) 0.47% Av. P. | | Low Phytate Corn Treatments | | | | | | | |
|---|---|---|---|---|---|---|---|---|---|---|
| | | | LPC47 0.47% Av. P. | | LPC40 0.40% Av. P. | | LPC33 0.33% Av. P. | | LPC26 0.26% Av. P. | |
| Arginine (%) | {0.81} | 0.81 | [0.85] | 0.81 | [[0.91] | 0.82 | [0.94] | 0.83 | [0.92] | 0.85 | [0.86] |
| Cystine (%) | | 0.24 | [0.21] | 0.24 | [0.23] | 0.24 | [0.23] | 0.24 | [0.25] | 0.24 | [0.22] |
| Histidine (%) | | 0.36 | [0.41] | 0.35 | [0.43] | 0.36 | [0.44] | 0.36 | [0.43] | 0.36 | [0.43] |
| Isoleucine (%) | | 0.59 | [0.58] | 0.58 | [0.61] | 0.59 | [0.63] | 0.60 | [0.62] | 0.61 | [0.60] |
| Leucine (%) | | 1.35 | [1.37] | 1.29 | [1.43] | 1.30 | [1.40] | 1.31 | [1.43] | 1.32 | [1.40] |
| Lysine (%) | {0.62} | 0.70 | [0.71] | 0.70 | [0.76] | 0.70 | [0.79] | 0.70 | [0.76] | 0.70 | [0.80] |
| Methionine (%) | {0.30} | 0.34 | [0.30] | 0.34 | [0.29] | 0.34 | [0.31] | 0.34 | [0.35] | 0.34 | [0.34] |
| MET + CYS (%) | {0.52} | 0.58 | [0.51] | 0.58 | [0.52] | 0.58 | [0.54] | 0.58 | [0.60] | 0.58 | [0.56] |
| Phenylalanine (%) | | 0.71 | [0.70] | 0.69 | [0.75] | 0.69 | [0.75] | 0.70 | [0.75] | 0.71 | [0.70] |
| Tyrosine (%) | | 0.28 | [0.31] | 0.26 | [0.34] | 0.27 | [0.35] | 0.27 | [0.34] | 0.27 | [0.32] |
| Threonine (%) | {0.50} | 0.51 | [0.57] | 0.50 | [0.60] | 0.50 | [0.63] | 0.51 | [0.60] | 0.52 | [0.51] |
| Tryptophan (%) | {0.15} | 0.15 | [0.19] | 0.16 | [0.19] | 0.16 | [0.19] | 0.16 | [0.19] | 0.16 | [0.19] |
| Valine (%) | | 0.67 | [0.67] | 0.67 | [0.71] | 0.68 | [0.73] | 0.69 | [0.71] | 0.70 | [0.71] |
| C18:2 (%) | {1.31} | 1.92 | | 1.92 | | 1.92 | | 1.91 | | 1.92 | |

[A]Other = Choline chloride and salt added to help meet requirements for choline and sodium.
[B]Number in [ ] brackets represent actual analyzed total values.
[C]Numbers in { } represent requirement specified for feed formulation purposes, with the exception of lysine, methionine and Met + Cys which were specified on a digestible basis. The calculated dietary nutrient content represents total level and not digestible.

Measurements of egg yolk total cholesterol, high density lipoprotein (HDL) and low density lipoprotein (LDL) were taken on days 28 and 140. The measurements are displayed in Tables 6–7 below. Table 6 lists cholesterol concentration in grams/100 grams of yolk. Table 7 shows cholesterol concentration in grams/egg.

TABLE 6

Effect of corn source and available P level on yolk cholesterol content (grams/100 grams)

| Treatment | | DAY 28 | | | DAY 140 | | |
|---|---|---|---|---|---|---|---|
| Corn | Avail. P % | Total Cholesterol | HDL | LDL | Total Cholesterol | HDL | LDL |
| YDC47 | 0.47 | 1.158[a] | 0.325[a] | 0.833[a] | 1.494[a] | 0.470[a] | 1.024[a] |
| LPC47 | 0.47 | 1.062[b] | 0.278[b] | 0.785[b] | 1.277[b] | 0.396[b] | 0.880[b] |
| LPC40 | 0.40 | 1.039[bc] | 0.285[b] | 0.754[bc] | 1.250[bc] | 0.383[bc] | 0.867[bc] |
| LPC33 | 0.33 | 1.003[cd] | 0.262[c] | 0.741[c] | 1.234[bc] | 0.379[bc] | 0.855[bc] |
| LPC26 | 0.26 | 0.978[d] | 0.262[c] | 0.716[c] | 1.221[c] | 0.376[c] | 0.846[c] |
| Statistical Analyses: | | | | | | | |
| R2 | | 0.6182 | 0.6673 | 0.5190 | 0.7519 | 0.6643 | 0.6905 |
| Treatment | | 0.0001 | 0.0001 | 0.0001 | 0.0001 | 0.0001 | 0.0001 |
| SEM | | 0.013 | 0.004 | 0.010 | 0.015 | 0.007 | 0.012 |

[abc]Means with the same letter within a column, are not significantly different at $P < 0.05$.

TABLE 7

Effect of corn source and available P level on egg cholesterol content (grams/egg)

| Treatment | | DAY 28 | | | DAY 140 | | |
|---|---|---|---|---|---|---|---|
| Corn | Avail. P % | Total Cholesterol | HDL | LDL | Total Cholesterol | HDL | LDL |
| YDC47 | 0.47 | 0.154[a] | 0.043[a] | 0.110[a] | 0.269[a] | 0.085[a] | 0.184[a] |
| LPC47 | 0.47 | 0.142[ab] | 0.037[bc] | 0.105[ab] | 0.235[b] | 0.073[b] | 0.162[b] |
| LPC40 | 0.40 | 0.139[bc] | 0.038[b] | 0.101[bc] | 0.228[bc] | 0.070[bc] | 0.159[bc] |
| LPC33 | 0.33 | 0.132[bc] | 0.035[c] | 0.097[bc] | 0.216[cd] | 0.066[cd] | 0.149[cd] |
| LPC26 | 0.26 | 0.128[c] | 0.034[c] | 0.094[c] | 0.208[d] | 0.063[d] | 0.144[d] |

TABLE 7-continued

Effect of corn source and available P level on egg cholesterol content (grams/egg)

| Treatment | | DAY 28 | | | DAY 140 | | |
|---|---|---|---|---|---|---|---|
| Corn | Avail. P % | Total Cholesterol | HDL | LDL | Total Cholesterol | HDL | LDL |
| Statistical Analyses: | | | | | | | |
| R2 | | 0.2353 | 0.3153 | 0.2010 | 0.5366 | 0.5357 | 0.4935 |
| Treatment | | 0.0008 | 0.0001 | 0.0031 | 0.0001 | 0.0001 | 0.0001 |
| SEM | | 0.004 | 0.001 | 0.003 | 0.005 | 0.002 | 0.004 |

[a,b,c]Means with the same letter within a column, are not significantly different at $P < 0.05$.

As shown by the data of Tables 6–7, dietary treatments fed significantly affect the yolk total cholesterol, high density lipoprotein (HDL) and low density lipoprotein (LDL) contents at day 28 and 140. The low phytate corn based diets led to significantly lower yolk cholesterol, HDL and LDL for both periods when compared to hens fed the YDC47 control treatment.

Phosphorus level also played a role in the cholesterol, HDL and LDL, reduction for both time periods. Cholesterol, HDL and LDL levels generally decreased with decreasing total phosphorus, dietary available P, and phytate P. When these lipid components are expressed on a per egg basis (Table 7), there are significant differences between the low phytate corn based diets and the YDC based diet, with the exception for total cholesterol and LDL at day 28. With total cholesterol and LDL at day 28, there was no significant difference between the YDC47 and LPC47 treatments.

Reduction of available P in the low phytate corn diets significantly lowered the LDL content (Table 6). In general, lowering the available P level of the diet lowered the cholesterol, HDL and LDL levels at both time periods. The lowest values for these parameters were usually observed with the lowest or two lowest dietary available P levels and the lowest total P levels. When expressing cholesterol, HDL and LDL in terms of egg content (Table 7), significant differences between the YDC47 and LPC47 treatments occurred for HDL at day 28 and for all parameters at day 140. Lowering the dietary available P level to that of the LPC40 treatment created a significant difference for cholesterol and LDL at day 28 when compared to hens receiving the YDC47 feed. Further lowering the available P level of the diet decreased the cholesterol, HDL and LDL levels at both time periods studied. The analyzed crude fiber content was similar between all treatments for phase 5, with a range of 3.44 to 3.06% (As Is basis). The YDC47 and LPC47 diets were formulated to have similar nutrient contents with the only difference being corn source and dietary phytate P content. Despite this, significant differences in egg cholesterol were observed.

EXAMPLE 2

Two separate trials were conducted where broiler chicks (Cobb×Cobb) were fed 4 experimental diets from 1 day of age to 49 days of age. The experimental design consisted of 4 dietary treatments with 6 replicate pens of 50 chicks. The chicks were maintained in floor pens with feed and water made available for ad libitum consumption. The experimental diets are presented in Tables 8–10 below. The diets were formulated to meet or exceed the requirements of broiler chickens as established by the NRC (1994). The feeding program consisted of a starter diet fed to the chicks from day of age to 21 days of age, followed by a grower diet fed from 21 days to 42 days of age, and a finisher diet fed from 42 to 49 days of age. The experimental diets included a control diet and a diet formulated with low phytate corn (Pioneer Hi-Bred International, Inc., Johnston, Iowa).

TABLE 8

Formulations of starter diets which were fed from 1 day of age to 21 days of age (g)

| Ingredient | Control | Low Phytate |
|---|---|---|
| Yellow Dent Corn | 608.79 | 0.00 |
| Low Phytate Corn | 0.00 | 609.40 |
| Soybean Meal | 330.08 | 331.59 |
| Poultry Oil | 17.63 | 18.12 |
| Salt | 5.04 | 5.05 |
| DL Methionine | 2.55 | 2.28 |
| Lysine HCl 98% | 1.35 | 1.21 |
| Threonine | 0.15 | 0.12 |
| Sacox Salinomycin[2] | 0.50 | 0.50 |
| BMD-50 Bacitracin[3] | 0.50 | 0.50 |
| Broiler Vitamin Mix[4] | 2.00 | 2.00 |
| Trace Mineral Mix[5] | 1.00 | 1.00 |
| Limestone | 10.44 | 12.99 |
| Dicalcium Phosphate | 19.97 | 15.24 |
| Washed Sand | 0.00 | 0.00 |
| TOTAL | 1000.00 | 1000.00 |

[1]Sacox 60, Hoechst-Roussel Agri-Vet Co., Somerville, NJ 08876. Provides 66 mg/kg salinomycin activity.
[2]BMD-50, ALPharma, Inc., Ft. Lee, NJ. Provides 55 mg/kg bacitracin methylene disalicylate activity.
[3]Provides per kg of diet: 7714 IU Vitamin A; 2204 IU cholecalciferol; 16.53 IU vitamin E; .013 mg vitamin $B_{12}$; 6.6 mg riboflavin; 39 mg niacin; 10 mg pantothenic acid; 465 mg choline; 1.5 mg vitamin K; 0.9 mg folic acid; 1.54 mg thiamin; 2.76 mg pyridoxine; .066 mg d-biotin; 125 mg ethoxyquin; .1 mg Se.
[4]Provides per kg of diet: Mn (from $MnSO_4$—$H_2O$) 100 mg; Zn (from $ZnSO_4$—$7H_2O$) 100 mg; Fe (from $FeSO_4$—$7H_2O$) 50 mg; Cu (from $CuSO_4$—$5H_2O$) 10 mg; I (from $Ca(IO_3)_2$—$H_2O$) 1 mg.

TABLE 9

Formulations of finisher diets which were fed from 21 days of age to 42 days of age (g)

| Ingredient | Control | Low Phytate |
|---|---|---|
| Yellow Dent Corn | 662.65 | 0.00 |
| Low Phytate Corn | 0.00 | 663.34 |
| Soybean Meal | 281.98 | 283.56 |
| Poultry Oil | 14.91 | 15.43 |
| Salt | 5.04 | 5.06 |
| DL Methionine | 2.09 | 1.80 |
| Lysine HCl 98% | 0.67 | 0.52 |

TABLE 9-continued

Formulations of finisher diets which were fed from 21 days of age to 42 days of age (g)

| Ingredient | Control | Low Phytate |
|---|---|---|
| Threonine | 0.00 | 0.00 |
| Sacox Salinomycin[2] | 0.50 | 0.50 |
| BMD-50 Bacitracin[3] | 0.50 | 0.50 |
| Broiler Vitamin Mix[4] | 2.00 | 2.00 |
| Trace Mineral Mix[5] | 1.00 | 1.00 |
| Limestone | 9.83 | 12.61 |
| Dicalcium Phosphate | 18.83 | 13.68 |
| Washed Sand | 0.00 | 0.00 |
| TOTAL | 1000.00 | 1000.00 |

[1]Sacox 60, Hoechst-Roussel Agri-Vet Co., Somerville, NJ 08876. Provides 66 mg/kg salinomycin activity.
[2]BMD-50, ALPharma, Inc., Ft. Lee, NJ. Provides 55 mg/kg bacitracin methylene disalicylate activity.
[3]Provides per kg of diet: 7714 IU Vitamin A; 2204 IU cholecalciferol; 16.53 IU vitamin E; .013 mg vitamin $B_{12}$; 6.6 mg riboflavin; 39 mg niacin; 10 mg pantothenic acid; 465 mg choline; 1.5 mg vitamin K; 0.9 mg folic acid; 1.54 mg thiamin; 2.76 mg pyridoxine; .066 mg d-biotin; 125 mg ethoxyquin; .1 mg Se.
[4]Provides per kg of diet: Mn (from $MnSO_4$—$H_2O$) 100 mg; Zn (from $ZnSO_4$—$7H_2O$) 100 mg; Fe (from $FeSO_4$—$7H_2O$) 50 mg; Cu (from $CuSO_4$—$5H_2O$) 10 mg; I (from $Ca(IO_3)_2$—$H_2O$) 1 mg.

TABLE 10

Formulations of finisher diets which were fed from 42 days of age to 49 days of age (g)

| Ingredient | Control | Low Phytate |
|---|---|---|
| Yellow Dent Corn | 718.94 | 0.00 |
| Low Phytate Corn | 0.00 | 719.65 |
| Soybean Meal | 230.51 | 232.29 |
| Poultry Oil | 11.39 | 11.97 |
| Salt | 5.04 | 5.06 |
| DL Methionine | 1.87 | 1.55 |
| Lysine HCl 98% | 1.14 | 0.98 |
| Threonine | 0.16 | 0.12 |
| Sacox Salinomycin[2] | 0.50 | 0.50 |
| BMD-50 Bacitracin[3] | 0.50 | 0.50 |
| Broiler Vitamin Mix[4] | 2.00 | 2.00 |
| Trace Mineral Mix[5] | 1.00 | 1.00 |
| Limestone | 9.22 | 12.24 |
| Dicalcium Phosphate | 17.73 | 12.14 |
| Washed Sand | 0.00 | 0.00 |
| TOTAL | 1000.00 | 1000.00 |

[1]Sacox 60, Hoechst-Roussel Agri-Vet Co., Somerville, NJ 08876. Provides 66 mg/kg salinomycin activity.
[2]BMD-50, ALPharma, Inc., Ft. Lee, NJ. Provides 55 mg/kg bacitracin methylene disalicylate activity.
[3]Provides per kg of diet: 7714 IU Vitamin A; 2204 IU cholecalciferol; 16.53 IU vitamin E; .013 mg vitamin $B_{12}$; 6.6 mg riboflavin; 39 mg niacin; 10 mg pantothenic acid; 465 mg choline; 1.5 mg vitamin K; 0.9 mg folic acid; 1.54 mg thiamin; 2.76 mg pyridoxine; .066 mg d-biotin; 125 mg ethoxyquin; .1 mg Se.
[4]Provides per kg of diet: Mn (from $MnSO_4$—$H_2O$) 100 mg; Zn (from $ZnSO_4$—$7H_2O$) 100 mg; Fe (from $FeSO_4$—$7H_2O$) 50 mg; Cu (from $CuSO_4$—$5H_2O$) 10 mg; I (from $Ca(IO_3)_2$—$H_2O$) 1 mg.

Body weights and feed consumption were determined when the chicks were 21, 42, and 49 days of age. When the birds were 49 days of age, 15 birds per pen were identified as having body weights closest to the mean body weight of the pen. Five birds were randomly selected from these identified birds per pen and were bled by cardiac puncture and whole blood was used to determine red blood cell counts, hematocrit, hemoglobin, mean corpuscular volume, mean corpuscular hemoglobin, mean corpuscular hemoglobin concentration, white blood cell counts, and differential leucocyte counts using a model 3500 Cell-Dyn hematology analyzer (Abbott Diagnostics, Abbott Park, Ill.) following the manufacturer's recommendations. Serum was collected and the clinical chemistry analysis of serum levels of calcium, phosphorus, uric acid, total protein, cholesterol, triglycerides, creatinine, and the enzyme activities of alkaline phosphatase, glutamyltransferase, and cholinesterase were measured using an automated clinical chemistry analyzer (Express Plus, Ciba-Corning Diagnostics Corp., Medfield, Mass.) following the manufacturer's procedures. Five birds per pen were killed by cervical dislocation and the left tibia was removed, and stored at 6° C. The bones were thawed, the central diameter was measured, and breaking strength was determined using an Instron Model 4502 Shear Press (Instron Corp., Canton, Mass.). The bones were fat extracted in a soxhlet extractor for 16 hrs with ethanol followed by 16 hrs with ethyl either, and ashed at 750° C. for 17 hrs. An additional five birds per pen were processed and parts yields were calculated as a percentage of eviscerated weight.

The data from these two trials were combined for statistical analysis and ease of presentation. All data presented as percentages were arcsine transformed prior to statistical analysis. The combined data were analyzed by ANOVA using the General Linear Models procedure of SAS software (SAS Institute, 1988). Significant differences between treatments were separated using Duncan's multiple range test. All statements of significance are based on the probability level of 0.05.

The effect of these treatments on the serum levels of cholesterol is presented in Table 11. As shown, diets prepared with low phytate corn significantly decreased the serum levels of cholesterol in the broilers. There were no significant or consistent treatment effects on parts yield, bone diameter, bone strength, or bone ash. There were no significant treatment effects on red blood cell count, hematocrits, hemoglobin, mean corpuscular volume, mean corpuscular hemoglobin, mean corpuscular hemoglobin concentration, leucocyte counts, or differential leucocyte counts. There were also no significant treatment effects on serum levels of calcium, phosphorus, uric acid, total protein, triglycerides, creatinine, or the activity of the serum enzymes glutamyltransferase, or cholinesterase.

TABLE 11

The effect of low phytate corn on serum cholesterol levels

| Treatment | Cholesterol (mg/dl) Trial #1 | Cholesterol (mg/dl) Trial #2 | Cholesterol (mg/dl) Combined |
|---|---|---|---|
| Yellow Dent Corn | 157 ± 6[a] | 159 ± 6[a] | 158 ± 4[a] |
| Low Phytate corn | 150 ± 4[a] | 140 ± 4[b] | 145 ± 3[b] |

EXAMPLE 3

This trial is designed to evaluate whether a similar response occurs in the ruminant animal by evaluating cholesterol content in blood and tissue of finishing beef steers fed low phytate corn. Ten head of Angus-based crossbred beef steers weighing approximately 986 lbs. were randomly allotted into two groups and placed in two outside pens. The steers were fed a normal finishing diet for steers at their respective weight. Low phytate corn was fed as a replacement of the yellow dent corn in the diet. The test diets consisted on a dry matter basis of Dry Rolled Corn (80%), Alfalfa Silage (7.5%), Alfalfa Hay (7.5%) and Supplement (5%). No changes were made in diet formulation to compensate for the additional available phosphorus from the low phytate corn. Feeding low phytate corn to finishing steers numerically improved average daily gain by 3.5% (2.65 lb./day versus 2.56 lb./day) and feed efficiency by 3.9% (7.64 lb. versus 7.95 lb.). More importantly, feeding of low phytate corn numerically reduced the cholesterol content in muscle tissue by 14.7% (0.544 mg/g versus 0.638 mg/g) and in the adipose tissue by 7.0% (0.764 mg/g versus 0.822 mg/g).

Upon initiation of the trial, steers were weighed, blood was drawn and biopsy samples taken. Steers were biopsied (both adipose and muscle removed at 7/8 rib) at the beginning of the trial to establish at base line for each animal. The trial was terminated when the steers reached market weight and were either slaughtered or sold. At that time tissue (muscle and adipose) and blood samples were taken to complete the trial. Cholesterol analysis was performed on tissue and blood samples.

The following procedure was used to obtain biopsies of fat and muscle:

1. Locate the area of the loin that corresponds to the 8th rib.
2. Clip hair from large square area beginning about 3 in. laterally from the midline and 4–6 in. perpendicular from either side of the 8th rib.
3. Scrub area with betadine or other comparable sterilant. Note: The incision will begin approx. 4–6 in. perpendicular to the midline at the location of the 8th rib. The incision will need to be approx. 3 in. long.
4. Administer 12–15 ml (or as needed) of lidocain subcutaneously (SQ) in the area where the incision is to be made.
5. Make incision through the skin to expose the SQ adipose tissue (may need mosquito hemostats to control bleeding).
6. Using thumb forceps and scalpel carefully obtain SQ fat sample.***
7. Put sample in whirl-pack.
8. Place whirl-pack over dry ice until sample can be placed in freezer.
9. Store frozen for future analysis.
10. Using thumb forceps and scalpel carefully obtain longissimus dorsi (LD) muscle sample.***
11. Put sample in whirl-pack.
12. Place whirl-pack over dry ice until sample can be placed in freezer.
13. Store frozen for future analysis.
14. Suture opposing edges of the skin using O chromic gut.
15. Irrigate wound with antibiotic.
16. Administer intramuscular injection of antibiotic.
17. Clean wound area and protect from flies and other pests.

***Obtain a sample size of 2–5 g of fresh tissue (preferably 5 grams). However, recognize that the abundance of SQ fat and the fatty acid concentration in the muscle may vary depending upon the animals' age, weight, breed, and degree of fatness. Leaner animals would likely require a larger muscle sample to be taken since the fatty acid concentration would be low compared with fatter animals. If need be, SQ fat can also be sampled from around the tail head.

Animal performance was analyzed by GLM procedures. Blood, muscle and adipose samples were analyzed by GLM procedures using bodyweight as a covariate.

Chemical analysis of the corn and rations are shown in Tables 12 and 13. Both reveal the consistency of the corn treatments utilized in the trial as well as the consistency in diet formulation. The Yellow Dent Corn (Alicia) and Low Phytate Corn (Alicia-L) utilized in the trial was grown, harvested and placed in cold storage for long term storage prior to feeding.

TABLE 12

Chemical Analysis of Corns

| Item | Yellow Dent Corn | Low Phytate Corn |
| --- | --- | --- |
| Dry Matter, % | 88.80 | 88.84 |
| Fat, % of DM | 3.53 | 3.34 |
| Protein, % of DM | 9.16 | 9.20 |
| Starch, % of DM | 69.15 | 69.20 |
| Ca, % of DM | .005 | .004 |
| P, % of DM | .27 | .27 |

TABLE 13

Chemical Analysis of Ration Treatments

| Item | Yellow Dent Corn | Low Phytate Corn |
| --- | --- | --- |
| Dry Matter, % | 78.07 | 77.92 |
| Fat, % of DM | 3.33 | 3.35 |
| Protein, % of DM | 12.93 | 12.96 |
| Starch, % of DM | 47.80 | 45.00 |
| Ca, % of DM | .55 | .55 |
| P, % of DM | .36 | .36 |

Animal performance data in Table 14 revealed numeric differences (P>0.05) in average daily gain and feed efficiency. Feeding low phytate corn to finishing steers improved average daily gain by 3.5% and feed efficiency by 3.9%.

TABLE 14

Animal Performance

| Item | Yellow Dent | Low Phytate |
| --- | --- | --- |
| No. Hd. | 5 | 5 |
| Initial wt., lb. | 975.20 | 996.00 |
| Final wt., lb. | 1261.60 | 1293.40 |
| ADG, lb./d | 2.56 | 2.65 |
| F/G, lb. DM | 7.95 | 7.64 |

Animals had blood drawn and were biopsied on Day 0 (Table 15) to establish a baseline for the parameters being measured for the cholesterol analysis. The animals were bled again when the trial was terminated (Day 112). In addition, muscle and adipose tissue were sampled when the animals were slaughtered (Table 16). Seven steers that were on the trial were slaughtered when the trial was terminated (four for the low phytate treatment and three for the normal treatment). The remaining three steers (one steer for the low phytate treatment and two steers for the normal treatment) were biopsied since they had not reached market weight. These results reveal that the feeding of low phytate corn numerically reduced the cholesterol content in the muscle by 14.7% and in the adipose tissue by 7.0%.

TABLE 15

Initial- Blood, Muscle and Adipose Tissue Analysis

| Item | Yellow Dent Corn | Low Phytate Corn |
|---|---|---|
| Blood Chemistries (mg/dl) | | |
| Triglycerides | 16.06 | 20.14 |
| HDL | 74.62 | 67.21 |
| LDL | 46.30 | 50.49 |
| Ratio HDL:LDL | 1.81 | 1.52 |
| Total Cholesterol | 124.43 | 121.76 |
| Muscle Tissue (mg/g tissue) Total Cholesterol | .641 | .592 |
| Adipose Tissue (mg/g tissue) Total Cholesterol | .729 | .652 |

TABLE 16

Final Blood, Muscle and Adipose Tissue Analysis

| Item | Yellow Dent Corn | Low Phytate Corn |
|---|---|---|
| Blood Chemistries (mg/dl) | | |
| Triglycerides | 27.03 | 27.14 |
| HDL | 73.49 | 74.27 |
| LDL | 49.58 | 60.82 |
| Ratio HDL:LDL | 1.62 | 1.31 |
| Total Cholesterol | 135.57 | 141.22 |
| Muscle Tissue (mg/g tissue) Total Cholesterol | .638 | .544 |
| Adipose Tissue (mg/g tissue) Total Cholesterol | .822 | .764 |

EXAMPLE 4

A study was conducted to determine if feeding low phytate corn to broilers would impact the cholesterol levels of blood serum and meat (thigh and breast) samples.

Day-old male broiler chicks of a commercial strain cross were placed in floor pens containing new (dry) pine litter shavings. Approximately 3400 males were ordered at initiation of the trial to ensure 1632 healthy male chicks were available at the start of the study. Birds were not replaced once the study started. Bird density was 0.70 ft$^2$/bird. Chicks (68 birds/pen) were weighted and randomly allocated to 24 floor pens, thus providing 12 pens/treatment. Feed and water were provided ad-libitum throughout the trial. The feeding phases were: starter (0–21 days), grower (21–42 days) and finisher (42–56 days of age).

Corn sources for the study were: yellow dent corn (YDC) grown in 1996 at the Pioneer Livestock Nutrition Center and low phytate corn grown in 1997 at Snowhill, Md. Nutrient profiles of the corns used in the feed formulation are provided in Table 17.

The two dietary treatments were YDC and LPC. Diets were formulated to have similar dietary nutrient contents and meet the NRC (1994) recommendations for broilers, with consideration for commercial practices. Diets were pelleted for the study.

Serum Triglycerides, Cholesterol (CHL), HDL, LDL and CHL:HDL Ratio (Table 21)

Serum triglycerides levels were significantly (P<0.05) reduced for broilers fed the LPC corn diet. There was nearly a 42% decrease in triglyceride levels.

Total serum cholesterol level was not significantly affected by the corn source utilized but there was nearly a numerical 5% reduction in the cholesterol level. High density lipoprotein (HDL) level also was not significantly (P<0.05) impacted by the corn source fed the broilers, but the HDL level of the LPC fed broilers was numerically increased by nearly 6.5% over that of the YDC fed broilers.

Low density lipoprotein (LDL) level was significantly (P<0.05) lower from broilers fed the LPC based diet. Serum LDL levels from broilers fed the LPC diets was about 37% lower than the level observed for broilers fed the YDC based diet.

The CHL:HDL ratio was significantly (P<0.05) less for broilers fed the LPC based diets, such that the ratio was about 9 to 10% less for these broilers versus those fed the YDC diet.

Meat Cholesterol, HDL, and LDL Levels (Table 22)

Cholesterol levels of the thigh and breast meat samples were not significantly (P<0.05) different between broilers fed the LPC or YDC diets. Broilers fed the LPC diets exhibited a numerical reduction of cholesterol by about 4.4% (breast) to 4.7% (thigh) compared with meat samples from broilers fed the YDC diets.

The thigh HDL level was not significantly impacted by the corn type fed, but was numerically increased (5%) for broilers fed the LPC. Breast HDL levels were significantly higher for broilers fed the LPC based diets. There was approximately nearly a 6% increase in the HDL level of breast meat samples from broilers fed the LPC diet.

The LDL level of both thigh and breast meat were significantly (P<0.05) lowered when broilers consumed the LPC based diets. The LDL reduction was about 6.9% (thigh) to 6.7% (breast) when samples from LPC fed broilers are compared to YDC fed birds.

The following identifiers are used in the tables below.

[1]Numbers in parenthesis represents dietary requirements that were used for the rations.
[2]Numbers in brackets for proximate analyses, amino acids and minerals represent actual analyzed values.
[3]Total EAA for calculated content excludes Histidine value since it was not on the feed formulation of the starter and grower feeds, but analyzed total EAA level does account for HIS contribution.

TABLE 17

Nutrient composition of test corns utilized in feed formulations for test diets.

| | "As Is Basis" | |
|---|---|---|
| Nutrient | Yellow Dent Corn | Low Phytate Corn |
| Moisture (%) | 13.40 [13.62]* | 13.90 [14.07] |
| Dry Matter (%) | 86.60 [86.38] | 86.10 [85.93] |
| TMEn (kcal/kg) | 1552 | 1549 |
| Crude Protein (%) | 8.64 [8.51] | 9.03 [8.79] |
| Crude Fat (%) | 3.37 [3.63] | 3.54 [3.59] |
| Crude Fiber (%) | 1.63 [1.80] | 2.02 [2.30] |
| Ash (%) | 1.02 [1.30] | 1.20 [1.14] |
| Calcium (%) | 0.006 [0.010] | 0.005 [0.008] |
| Total Phosphorus (%) | 0.24 [0.24] | 0.24 [0.24] |
| Phytic Acid P. (%) | 0.18 | 0.08 |
| Phytic Acid P (% of T.P.) | 75.00 | 33.33 |
| Calculated Available Phos. (%) | 0.05 | 0.16 |
| Arginine (%) | 0.34 [0.32] | 0.35 [0.33] |
| Histidine (%) | 0.25 [0.26] | 0.24 [0.26] |
| Isoleucine (%) | 0.27 [0.27] | 0.25 [0.24] |
| Leucine (%) | 1.09 [1.02] | 1.00 [1.03] |
| Lysine (%) | 0.22 [0.22] | 0.26 [0.22] |
| Methionine (%) | 0.15 [0.17] | 0.17 [0.19] |

TABLE 17-continued

Nutrient composition of test corns utilized in feed formulations for test diets.

|  | "As Is Basis" | |
|---|---|---|
| Nutrient | Yellow Dent Corn | Low Phytate Corn |
| MET + Cystine (%) | 0.33 [0.35] | 0.36 [0.38] |
| Phenylalanine (%) | 0.42 [0.40] | 0.39 [0.40] |
| PHE + Tyrosine (%) | 0.65 [0.55] | 0.54 [0.56] |
| Threonine (%) | 0.29 [0.30] | 0.32 [0.32] |
| Tryptophan (%) | 0.05 [0.05] | 0.07 [0.06] |
| Valine (%) | 0.36 [0.36] | 0.35 [0.33] |
| Total EAA (%) | 3.85 [3.70] | 3.74 [3.73] |
| Total NEAA (%) | 4.28 [3.84] | 4.40 [4.19] |
| C16:0 (%) | 0.36 | NA[1] |
| C18:0 (%) | 0.07 | NA |
| C18:1 (%) | 0.97 | NA |
| C18:2 (%) | 2.44 | 2.56 |
| C18:3 (%) | 0.05 | NA |

*Numbers in brackets represent analyzed values of corn samples taken when feed mixed.
[1]NA = Not Available

TABLE 18

Composition of test diets for starter phase (0–21 days of age)

| Ingredient | | Yellow Dent Corn | Low Phytate Corn |
|---|---|---|---|
| | | % of diet | |
| Yellow Dent corn | | 55.43 | — |
| Low Phytate corn | | — | 56.25 |
| Soybean Meal (48%) | | 34.35 | 33.78 |
| Animal/Vegetable fat | | 6.17 | 6.05 |
| Limestone | | 1.15 | 1.34 |
| Dicalcium Phosphate | | 1.82 | 1.51 |
| DL-Methionine | | 0.26 | 0.24 |
| L-Lysine HCl | | 0.08 | 0.07 |
| Trace Minerals Premix | | 0.075 | |
| Vitamin Premix | | 0.025 | |
| Other* | | to 100% | |
| Feed cost/ton of feed | | $112.03/ton | $110.32/ton |
| Calculated and Analyzed Nutrient Composition (As Is Basis): | | | |
| Dry Matter (%) | | 83.02 [86.68] | 82.80 [86.66] |
| Metabolizable Energy (kcal/lb) | {1429} | 1429 | 1429 |
| Crude Protein (%) | {21.5} | 21.50 [22.68] | 21.50 [22.53] |
| Crude Fat (%) | | 8.15 [6.58] | 8.16 [7.58] |
| Crude Fiber (%) | | 1.88 [2.20] | 2.10 [2.40] |
| Ash (%) | | 5.27 [5.06] | 4.60 [5.38] |
| Calcium (%) | {0.96} | 0.96 [0.90] | 0.96 [0.79] |
| Available Phos. (%) | {0.48} | 0.48 | 0.48 |
| Total Phosphorus (%) | | 0.73 [0.71] | 0.66 [0.70] |
| Phytate Phosphorus (%) | | 0.248 | 0.190 |
| Phytate Phosphorus (% of T.P.) | | 34 [35] | 29 [27] |
| Sodium (%) | | 0.20 | 0.20 |
| Chloride (%) | | 0.35 | 0.35 |
| Arginine (%) | {1.30}[1] | 1.45 [1.38][2] | 1.44 [1.31] |
| Histidine (%) | { } | [0.59] | [0.58] |
| Isoleucine (%) | {0.80} | 1.03 [0.90] | 1.00 [0.87] |
| Leucine (%) | {1.20} | 1.88 [1.86] | 1.81 [1.78] |
| Lysine (%) | {1.25} | 1.25 [1.21] | 1.25 [1.15] |
| Methionine (%) | {0.50} | 0.58 [0.53] | 0.58 [0.51] |
| MET + Cystine (%) | {0.92} | 0.92 [0.85] | 0.92 [0.82] |
| Phenylalanine (%) | {0.72} | 1.14 [1.06] | 1.11 [1.01] |
| PHE + Tyrosine (%) | {1.34} | 1.51 [1.56] | 1.44 [1.48] |
| Threonine (%) | {0.80} | 0.83 [0.83] | 0.84 [0.83] |
| Tryptophan (%) | {0.20} | 0.29 [0.24] | 0.29 [0.23] |
| Valine (%) | {0.90} | 1.11 [0.99] | 1.09 [0.96] |
| Total EAA (%)[3] | | 10.27 [10.44] | 10.08 [10.01] |
| Total NEAA (%) | | [9.84] | [9.99] |

TABLE 19

Composition of test diets for grower phase (21–42 days of age)

| Ingredient | | Yellow Dent Corn | Low Phytate Corn |
|---|---|---|---|
| | | % of diet | |
| Yellow Dent corn | | 61.46 | — |
| Low Phytate corn | | — | 62.37 |
| Soybean Meal (48%) | | 29.24 | 28.60 |
| Animal/Vegetable fat | | 5.90 | 5.77 |
| Limestone | | 1.02 | 1.23 |
| Dicalcium Phosphate | | 1.57 | 1.23 |
| DL-Methionine | | 0.17 | 0.15 |
| L-Lysine HCl | | 0.06 | 0.06 |
| Trace Minerals Premix | | 0.075 | |
| Vitamin Premix | | 0.025 | |
| Other* | | to 100% | |
| Feed cost/ton of feed | | $104.70/ton | $102.8/ton |
| Calculated and Analyzed Nutrient Composition (As Is Basis): | | | |
| Dry Matter (%) | | 82.98 [87.39] | 82.75 [87.46] |
| Metabolizable Energy (kcal/lb) | {1450} | 1450 | 1450 |
| Crude Protein (%) | {19.5} | 19.50 [20.53] | 19.50 [19.44] |
| Crude Fat (%) | | 8.06 [7.49] | 8.07 [7.55] |
| Crude Fiber (%) | | 1.83 [2.10] | 2.07 [2.00] |
| Ash (%) | | 4.69 [4.48] | 3.95 [4.50] |
| Calcium (%) | {0.84} | 0.84 [0.72] | 0.84 [0.62] |
| Available Phos. (%) | {0.42} | 0.42 | 0.42 |
| Total Phosphorus (%) | | 0.66 [0.66] | 0.59 [0.58] |
| Phytate Phosphorus (%) | | 0.236 | 0.17 |
| Phytate Phosphorus (% of T.P.) | | 36 [36] | 29 [29] |
| Sodium (%) | | 0.15 | 0.15 |
| Chloride (%) | | 0.27 | 0.27 |
| Arginine (%) | {1.10}[1] | 1.28 [1.20][2] | 1.10 [1.19] |
| Histidine (%) | {0.40} | [0.54] | [0.54] |
| Isoleucine (%) | {0.73} | 0.91 [0.80] | 0.89 [0.78] |
| Leucine (%) | {1.09} | 1.75 [1.72] | 1.68 [1.67] |
| Lysine (%) | {1.09} | 1.09 [1.02] | 1.09 [1.01] |
| Methionine (%) | {0.42} | 0.46 [0.43] | 0.46 [0.44] |
| MET + Cystine (%) | {0.78} | 0.78 [0.75] | 0.78 [0.78] |
| Phenylalanine (%) | {0.65} | 1.03 [0.94] | 1.00 [0.92] |
| PHE + Tyrosine (%) | {1.22} | 1.38 [1.37] | 1.30 [1.34] |
| Threonine (%) | {0.74} | 0.75 [0.75] | 0.76 [0.73] |
| Tryptophan (%) | {0.18} | 0.25 [0.22] | 0.26 [0.23] |
| Valine (%) | {0.82} | 0.99 [0.90] | 0.98 [0.88] |
| Total EAA (%) | | 9.18 [9.27] | 8.84 [9.15] |
| Total NEAA (%) | | [8.79] | [8.58] |

TABLE 20

Composition of test diets for finisher phase (42–56 days of age)

| Ingredient | | Yellow Dent Corn | Low Phytate Corn |
|---|---|---|---|
| | | % of diet | |
| Yellow Dent corn | | 65.38 | — |
| Low Phytate corn | | — | 66.36 |
| Soybean Meal (48%) | | 25.60 | 24.92 |
| Animal/Vegetable fat | | 6.13 | 5.99 |
| Limestone | | 0.91 | 1.13 |
| Dicalcium Phosphate | | 1.35 | 1.00 |
| DL-Methionine | | 0.10 | 0.08 |
| L-Lysine HCl | | 0.005 | — |
| Trace Minerals Premix | | 0.075 | |
| Vitamin Premix | | 0.025 | |
| Other* | | to 100% | |
| Feed cost/ton of feed | | $99.21/ton | $97.25 |
| Calculated and Analyzed Nutrient Composition (As Is Basis): | | | |
| Dry Matter (%) | | 82.59 [87.68] | 82.34 [87.70] |
| Metabolizable Energy (kcal/lb) | {1474} | 1474 | 1474 |
| Crude Protein (%) | {18.0} | 18.00 [18.84] | 18.00 [19.08] |
| Crude Fat (%) | | 8.39 [7.11] | 8.40 [7.67] |

TABLE 20-continued

Composition of test diets for finisher phase (42–56 days of age)

| Ingredient | | Yellow Dent Corn | Low Phytate Corn |
|---|---|---|---|
| | | % of diet | |
| Crude Fiber (%) | | 1.7 [2.40] | 2.04 [2.10] |
| Ash (%) | | 4.22 [4.06] | 3.44 [4.41] |
| Calcium (%) | {0.74} | 0.74 [0.56] | 0.74 [0.70] |
| Available Phos. (%) | {0.37} | 0.37 | 0.37 |
| Total Phosphorus (%) | | 0.60 [0.60] | 0.53 [0.57] |
| Phytate Phosphorus (%) | | 0.23 | 0.16 |
| Phytate Phosphorus (% of T.P.) | | 38 [38] | 30 [28] |
| Sodium (%) | | 0.15 | 0.15 |
| Chloride (%) | | 0.26 | 0.26 |
| Arginine (%) | {1.00}[1] | 1.16 [1.14][2] | 1.15 [1.13] |
| Histidine (%) | {0.27} | 0.47 [0.53] | 0.45 [0.52] |
| Isoleucine (%) | {0.62} | 0.83 [0.76] | 0.80 [0.75] |
| Leucine (%) | {0.93} | 1.66 [1.66] | 1.58 [1.65] |
| Lysine (%) | {0.93} | 0.94 [0.96] | 0.95 [0.92] |
| Methionine (%) | {0.35} | 0.38 [0.40] | 0.37 [0.36] |
| MET + Cystine (%) | {0.67} | 0.67 [0.71] | 0.67 [0.67] |
| Phenylalanine (%) | {0.56} | 0.95 [0.90] | 0.92 [0.88] |
| PHE + Tyrosine (%) | {1.04} | 1.29 [1.31] | 1.20 [1.28] |
| Threonine (%) | {0.68} | 0.69 [0.72] | 0.70 [0.70] |
| Tryptophan (%) | {0.16} | 0.22 [0.21] | 0.23 [0.21] |
| Valine (%) | {0.70} | 0.91 [0.85] | 0.89 [0.85] |
| Total EAA (%) | | 8.84 [8.84] | 8.62 [8.68] |
| Total NEAA (%) | | [8.42] | [8.29] |

TABLE 21

Broiler serum triglycerides and cholesterol (CHL) levels when fed either YDC or LPC sources

| Treatment | Triglycerides mg/dl | Cholesterol mg/dl | High Density Lipoprotein mg/dl | Low Density Lipoprotein mg/dl | CHL:HDL Ratio L |
|---|---|---|---|---|---|
| YDC | 68.20[a] | 126.67 | 90.80 | 28.55[a] | 1.41[a] |
| LPC | 39.83[b] | 120.38 | 96.73 | 17.95[b] | 1.28[b] |
| Pooled SEM | 6.44 | 3.58 | 3.18 | 3.54 | 0.02 |
| Statistical Analyses: | | | | | |
| R2 | 0.5429 | 0.4293 | 0.3103 | 0.3944 | 0.4809 |
| Prob < F | 0.0050 | 0.2282 | 0.2001 | 0.0452 | 0.0001 |

[a,b]Means with the same letter within a column are not significantly different ($P < 0.05$).

TABLE 22

Broiler thigh and breast cholesterol, HDL and LDL levels when fed either YDC or LPC sources

| | Thigh Meat | | | Breast Meat | | |
|---|---|---|---|---|---|---|
| | Cholesterol | HDL | LDL | Cholesterol | HDL | LDL |
| Treatment | mg/100 g wet tissue | | | mg/100 g wet tissue | | |
| YDC | 139.38 | 26.13 | 113.24[a] | 42.08 | 7.84[a] | 34.24[a] |
| LPC | 132.87 | 27.45 | 105.42[b] | 40.24 | 8.30[b] | 31.93[b] |
| SEM | 2.63 | 0.50 | 2.41 | 0.74 | 0.15 | 0.69 |
| Statistical Analyses: | | | | | | |
| R2 | 0.1222 | 0.1374 | 0.1934 | 0.1226 | 0.1846 | 0.2005 |
| Prob < F | 0.0941 | 0.0745 | 0.0315 | 0.0934 | 0.0361 | 0.0282 |

[a,b]Means with the same letter within a column are not significantly different ($P < 0.05$).

EXAMPLE 5

A 14 day broiler chick study was conducted to examine the influence of yellow dent corn (YDC), low phytate corn (LPC), high oil corn (HOC) and low phytate/high oil corn (LPCHOC) on bird performance and phosphorus (P) excretion. Male broiler chicks of a commercial strain were fed a standard starter feed from 0 to 7 days of age, at which time they were placed on the experimental diets for 14 days. All four corn-soybean meal based diets were formulated to have similar nutrient requirements. Each diet was fed to 7 reps with five male chicks per replication. Blood serum samples were taken from all chicks at the end of the study and sent for blood chemistry profile. Day old broiler chicks of a commercial strain were raised in battery cages on a standard broiler chick diet for 7 days. At day 7, they were placed on test diets for 2 weeks, until 21 days of age. Both water and the mash diets were provided ad-libitum to the birds.

Corn sources utilized in the study were: YDC=Snowhill, Md. (1997); LPC (Ipal)=Snowhill, Md. (1997); HOC= 32R90 (PHI, 1997); LPCHOC (Ipal)=PHI (Y1035F-LPC; 1997). Nutrient compositions of the corns utilized in the ingredient matrices of the feed formulations are listed in Table 23.

The corn-soybean meal based diets (Tables 23–25) were formulated to similar dietary nutrient contents that met or exceeded the NRC (1994) recommendations for broilers, with consideration for commercial practices. Feeds did not contain coccidiostats or antibiotics. Each diet was fed to 7 replicates of five male chicks per rep, thus providing a total of 35 chicks per treatment at the start of the study.

Measurements taken were body weights at day 7 and 21; feed intake and mortality during the two week study; serum samples from each chick at day 21; toe and tibia sample from each chick; fecal collection for entire two week study; fecal moisture and fecal phosphorus content. Apparent feed digestible P coefficients were calculated by the following equation:

Apparent Feed Digestible P (%)=(($P_{Intake}-P_{Excreted}$)/$P_{Intake}$)*100

Results

Blood Serum Measurements (Table 26)

Serum total cholesterol (CHL), high density lipoprotein (HDL), low density lipoprotein (LDL) and CHL:HDL ratio were not significantly ($P<0.05$) influenced by the type of corn fed (Table 26). By feeding the LPC corn diet to the chicks, there was a numerical increase in cholesterol (1%) and HDL (3.1%) followed by a numerical decrease in LDL by 4.5%. When feeding the HOC, cholesterol (5.2%), HDL (0.7%) and LDL (33.3%) decreased numerically. Utilizing LPCHOC as the dietary corn source resulted in numerical reductions in cholesterol (8.6%), HDL (4.4%) and LDL (35.1%) levels.

The larger numerical reductions in serum cholesterol, HDL and LDL for chicks fed the HOC versus those receiving the YDC or LPC corn may be a consequence of less added fat in the diet and possibly the better quality fat present in HOC compared to added fat. Furthermore, combining the high oil and low phytate traits (LPCHOC) led to the greatest numerical reductions in the CHL, HDL and LDL levels. A longer feeding period (>2 weeks) might have produced further reductions in total cholesterol.

TABLE 23

Nutrient composition (As Is Basis) of test corns[1]

| Nutrient | Yellow Dent Corn | Low Phytate Corn | High Oil Corn | Low Phytate High Oil Corn |
|---|---|---|---|---|
| Moisture (%) | 14.1 | 13.90 | 10.93 | 7.73 |
| Dry Matter (%) | 85.9 | 86.10 | 89.07 | 92.27 |
| TMEn (kcal/kg)[2] | 1517 | 1549 | 1678 | 1746 |
| Crude Protein (%) | 8.10 | 9.03 | 9.67 | 12.11 |
| Crude Fat (%) | 3.10 | 3.54 | 6.74 | 6.54 |
| Crude Fiber (%) | 1.98 | 2.02 | 2.90 | 2.70 |
| Ash (%) | 1.34 | 1.20 | 1.58 | 1.71 |
| Calcium (%) | 0.005 | 0.005 | 0.005 | 0.005 |
| Total Phosphorus (%) | 0.23 | 0.24 | 0.30 | 0.34 |
| Phytic Acid P. (%) | 0.18 | 0.08 | 0.214 | 0.133 |
| Phytic Acid P. (% of T.P.) | 78.3 | 33.3 | 71.3 | 39.0 |
| Calc. Available Phos. (%) | 0.05 | 0.16 | 0.092 | 0.207 |
| Arginine (%) | 0.32 | 0.35 | 0.39 | 0.47 |
| Histidine (%) | 0.20 | 0.24 | 0.24 | 0.31 |
| Isoleucine (%) | 0.22 | 0.25 | 0.28 | 0.38 |
| Leucine (%) | 0.86 | 1.00 | 1.11 | 1.52 |
| Lysine (%) | 0.25 | 0.26 | 0.28 | 0.33 |
| Methionine (%) | 0.17 | 0.17 | 0.20 | 0.30 |
| MET + Cystine (%) | 0.34 | 0.36 | 0.41 | 0.55 |
| Phenylalanine (%) | 0.34 | 0.39 | 0.42 | 0.58 |
| PHE + Tyrosine (%) | 0.48 | 0.54 | 0.59 | 0.90 |
| Threonine (%) | 0.29 | 0.32 | 0.36 | 0.43 |
| Tryptophan (%) | 0.073 | 0.071 | 0.07 | 0.09 |
| Valine (%) | 0.30 | 0.35 | 0.40 | 0.52 |

TABLE 23-continued

Nutrient composition (As Is Basis) of test corns[1]

| Nutrient | Yellow Dent Corn | Low Phytate Corn | High Oil Corn | Low Phytate High Oil Corn |
|---|---|---|---|---|
| Total Essential AA (%) | 3.33 | 3.74 | 4.13 | 5.50 |
| Alanine (%) | 0.54 | 0.63 | 0.70 | 0.91 |
| Aspartic Acid (%) | 0.54 | 0.60 | 0.64 | 0.78 |
| Glutamic Acid (%) | 1.39 | 1.63 | 1.59 | 2.24 |
| Glycine (%) | 0.30 | 0.32 | 0.36 | 0.43 |
| Proline (%) | 0.66 | 0.78 | 0.84 | 1.05 |
| Serine (%) | 0.41 | 0.45 | 0.49 | 0.56 |
| Total Non-Essential AA (%) | 3.84 | 4.41 | 4.62 | 5.97 |
| Fatty Acid Profiles (% of total fatty acid content) | | | | |
| Palmitic Acid (C16:0) | — | — | 11.9 | 10.80 |
| Palmitoleic Acid (C16:1) | — | — | — | 0.15 |
| Stearic Acid (C18:0) | — | — | 2.4 | 1.99 |
| Oleic Acid (C18:1) | — | — | 34.8 | 37.78 |
| Linoleic Acid (C18:2) | — | — | 49.3 | 46.99 |
| Linolenic Acid (C18:3) | — | — | 0.8 | 0.96 |
| Arachidic Acid (C20:0) | — | — | 0.5 | 0.44 |
| Eicosenoic Acid (C20:1) | — | — | — | 0.38 |
| Behenic Acid (C22:0) | — | — | — | 0.13 |
| Lignoceric Acid (C24:0) | — | — | — | 0.18 |

[1]Nutrient composition used in feed formulations.
[2]TMEn based on actual TMEn determination by modification of Sibbald method and adjusted to ME for feed formulation. Values were compared with energy equation by Araba et al (1998).

TABLE 24

Composition of test diets

| | % of diet | | | |
|---|---|---|---|---|
| Ingredient | YDC | LPC | HOC | LPCHOC |
| Yellow Dent corn | 52.41 | — | — | — |
| Low Phytate corn | — | 54.65 | — | — |
| High Oil corn | — | — | 60.41 | — |
| Low Phytate/High Oil corn | — | — | — | 66.45 |
| Soybean Meal (48%) | 36.68 | 35.27 | 33.25 | 29.63 |
| Animal/Vegetable fat | 7.22 | 6.47 | 2.63 | 0.20 |
| Limestone | 1.08 | 1.26 | 1.16 | 1.44 |
| Dicalcium Phosphate | 1.64 | 1.35 | 1.54 | 1.18 |
| DL-Methionine | 0.26 | 0.26 | 0.24 | 0.17 |
| L-Lysine HCl | — | 0.02 | 0.06 | 0.14 |
| Trace Minerals Premix | 0.075 | | | |
| Vitamin Premix | 0.025 | | | |
| Other* | to 100% | | | |

*Other refers to salt, choline chloride etc.

TABLE 25

Calculated and analyzed nutrient composition of test diets (As Is Basis)

| Nutrient | | YDC | LPC | HOC | LPCHOC |
|---|---|---|---|---|---|
| Dry Matter (%) | | 81.79 [89.35] | 82.11 [89.45] | 87.50 [89.41] | 91.74 [89.86] |
| Metabolizable Energy (kcal/lb) | | 1430 | 1430 | 1430 | 1431 |
| Crude Protein (%) | {22.0} | 22.00 [24.62] | 22.00 [24.40] | 22.00 [23.33] | 22.50 [23.16] |
| Crude Fat (%) | | 8.95 [9.51] | 8.51 [8.23] | 6.88 [6.62] | 4.75 [4.64] |
| Crude Fiber (%) | | 2.08 [3.30] | 2.09 [3.45] | 2.70 [2.95] | 2.64 [3.30] |
| Ash (%) | | 4.63 [5.76] | 4.49 [6.01] | 4.42 [5.93] | 4.17 [5.73] |

TABLE 25-continued

Calculated and analyzed nutrient composition of test diets (As Is Basis)

| Nutrient | | YDC | LPC | HOC | LPCHOC |
|---|---|---|---|---|---|
| Calcium (%) | {0.90} | 0.90 [0.87] | 0.90 [1.00] | 0.90 [0.89] | 0.91 [0.89] |
| Available Phos. (%) | {0.45} | 0.45 | 0.45 | 0.45 | 0.45 |
| Total Phosphorus (%) | | 0.69 [0.70] | 0.64 [0.66] | 0.72 [0.71] | 0.66 [0.64] |
| Phytate Phosphorus (%) | | 0.252 | 0.195 | 0.272 | 0.216 |
| Phytate Phosphonts (% of T.P.) | | 365 | 30.5 | 37.8 | 32.7 |
| Sodium (%) | {0.20} | 0.20 | 0.20 | 0.20 | 0.24 |
| Chloride (%) | | 0.35 | 0.36 | 0.36 | 0.43 |
| Arginine (%) | {1.38} | 1.51 [1.49] | 1.49 [1.46] | 1.46 [1.40] | 1.40 [1.32] |
| Histidine (%) | {0.40} | 0.54 [0.62] | 0.55 [0.63] | 0.54 [0.62] | 0.56 [0.60] |
| Isoleucine (%) | {0.80} | 1.05 [0.93] | 1.04 [0.93] | 1.02 [0.90] | 1.01 [0.86] |
| Leucine (%) | {1.38} | 1.81 [1.87] | 1.85 [1.92] | 1.90 [1.91] | 2.11 [1.97] |
| Lysine (%) | {1.25} | 1.27 [1.26] | 1.25 [1.26] | 1.25 [1.25] | 1.25 [1.23] |
| Methionine (%) | {0.50} | 0.60 [0.53] | 0.60 [0.48] | 0.59 [0.52] | 0.58 [0.51] |
| MET + Cystine (%) | {0.95} | 0.95 [0.81] | 0.95 [0.77] | 0.95 [0.83] | 0.95 [0.82] |
| Phenylalanine (%) | {0.75} | 1.15 [1.11] | 1.14 [1.12] | 1.13 [1.09] | 1.17 [1.08] |
| PHE + Tyrosine (%) | | 1.48 [1.64] | 1.48 [1.65] | 1.47 [1.59] | 1.59 [1.58] |
| Threonine (%) | {0.84} | 0.87 [0.95] | 0.87 [0.94] | 0.87 [0.92] | 0.87 [0.89] |
| Tryptophan (%) | {0.21} | 0.31 [0.30] | 0.30 [0.28] | 0.29 [0.30] | 0.28 [0.25] |
| Valine (%) | {0.90} | 1.13 [1.02] | 1.12 [1.04] | 1.12 [1.01] | 1.13 [0.96] |
| Total Essential AA (%) | | 10.92 [10.89] | 10.90 [10.88] | 10.87 [10.73] | 11.15 [10.48] |
| Alanine (%) | | [1.09] | [1.10] | [1.11] | [1.14] |
| Aspartic Acid (%) | | [2.60] | [2.61] | [2.49] | [2.33] |
| Glutamic Acid (%) | | [3.42] | [3.62] | [3.37] | [3.30] |
| Glycine (%) | | [0.95] | [0.94] | [0.92] | [0.88] |
| Proline (%) | | [1.32] | [1.35] | [1.32] | [1.34] |
| Serine (%) | | [1.23] | [1.23] | [1.21] | [1.18] |
| Total Non-Essential AA (%) | | [10.61] | [10.85] | [10.42] | [10.17] |
| Analyzed Fatty Acid Profiles (% of Total Fatty Acids): | | | | | |
| Palmitic | | [11.2] | [12.6] | [11.8] | [11.5] |
| Stearic | | [1.7] | [1.2] | [2.3] | [2.0] |
| Oleic | | [27.4] | [21.8] | [34.9] | [37.8] |
| Linoleic | | [58.4] | [63.2] | [49.7] | [47.8] |
| Linolenic | | [1.3] | [1.2] | [0.8] | [0.9] |
| Arachidonic | | [0.0] | [0.0] | [0.5] | [0.0] |

Numbers in brackets for proximates, amino acids and minerals represent actual analyzed values.
Numbers in parenthesis represent dietary requirements that were used for the rations.

TABLE 26

Effect of feeding different sources on the blood chemistry of broiler chicks

| Treatment | Cholesterol MG/DL | High Density Lipoprotein MG/DL | Low Density Lipoprotein MG/DL | CHL:HDL ratio | SGOT IU/L |
|---|---|---|---|---|---|
| YDC | 135.48 | 98.25 | 24.67 | 1.37 | 221 |
| LPC | 136.88 [+1.0][1] | 101.34 [+3.1] | 23.55 [−4.5] | 1.37 | 221 |
| HOC | 128.40 [−5.2] | 97.53 [−0.7] | 16.45 [−33.3] | 1.33 | 214 |
| LYCHOC | 123.82 [−8.6] | 93.88 [−4.4] | 16.00 [−35.1] | 1.34 | 211 |
| SEM | 8.30 | 6.03 | 3.57 | 0.03 | 13 |
| Statistical Analyses: | | | | | |
| R2 | 0.0640 | 0.0313 | 0.1705 | 0.0440 | 0.0192 |
| Treatment (P < F) | 0.6552 | 0.8548 | 0.2056 | 0.7768 | 0.9244 |

[1]Numbers in brackets represents the percent increase or decrease in relation to the control group (YDC).

EXAMPLE 6

This study was undertaken to determine if feeding high available phosphorus/low phytate corn (HAPC) would influence the cholesterol (CHL) levels in meat and abdominal fat samples taken from male broiler chickens after receiving these diets for 35 days. Day old male broiler chicks were placed 12 per cage with 10 cages per treatment. At day 7, the number of chicks per cage was reduced to 10 per cage. Chicks were fed either a yellow dent corn (YDC) diet or high available phosphorus/low phytate corn diet formulated to meet or exceed NRC (1994) nutrient recommendations. Diets were fed in pelleted form from 0 to 35 days of age. Measurements taken were Day 35 body weights, feed intake, feed:gain ratios; mortality, plus the total CHL levels of breast meat, thigh meat and abdominal fat samples.

Methods and Materials

Male broiler chicks of a commercial strain were utilized in the study (0 to 35 days of age). Chicks were randomly assigned to battery cages at 1 day of age. Each treatment was fed to 10 reps with 12 chicks per replicate. By day 7, the number of chicks per cage was reduced to 10. Each broiler was wingbanded for identification purposes. Water and feed were provided ad-libitum. The same starter diets were fed from 0 to 35 days of age.

All diets were formulated to meet or exceed the NRC (1994) recommendations with consideration for commercial practices. Listing of the test treatments and nutrient profiles of the corns and soybean meal are provided in Table 27. Both the YDC and HAP corn utilized in the study were from the PLNC'96 lots. Ingredient and nutrient compositions of the test diets are provided in Table 28. All diets were fed in pelleted form.

Measurements taken in the study were live weights at 35 days of age, feed intake for the entire study, feed conversion (Day 0 to 35), mortality number and weight, and then CHL level of meat (thigh and breast) and fat (abdominal) from broilers fed the two treatments.

Results

Total Cholesterol (Table 29)

The results of the cholesterol (CHL) measurements are presented in Table 29. The treatments studied in this experiment significantly (P<0.05) impacted the total CHL content in the breast meat of broilers. The highest level of CHL corresponded with male broilers fed the YDC diet. Utilizing HAPC instead of YDC in the diet, significantly reduced the CHL content of the breast meat providing a reduction of about 9.5%.

The treatments fed also significantly (P<0.05) affected the total CHL content in the thigh meat taken from broilers in this study. The highest level of CHL came from male broilers fed the YDC diet. Supplying HAP corn instead of YDC in the diet, significantly reduced the CHL content of the thigh meat, leading to about an 11.1% reduction.

Further, the diets utilized significantly (P<0.05) influenced the total CHL content in the broiler's abdominal fat. As with the meat samples, the highest level of CHL corresponded with male broilers fed the YDC diet. Utilizing HAPC instead of YDC in the diet, significantly reduced the CHL content of the abdominal fat thus providing approximately a 14% decrease.

TABLE 27

Nutrient composition of test ingredients used for feed formulation

| | Yellow Dent Corn (As Is Basis) | Low Phytate (HAP) Corn (As Is Basis) | Soybean Meal (48) (As Is Basis) |
|---|---|---|---|
| Moisture (%) | 13.4 [12.06][1] | 12.93 [12.01] | 9.75 [11.92] |
| TMEn (kcal/lb) | 1552 | 1625 | 1130 |
| Crude Protein (%) | 8.64 [8.74] | 8.64 [8.56] | 48.0 [49.78] |
| Crude Fat (%) | 3.37 [3.63] | 3.60 [3.54] | 0.70 [1.61] |
| Crude Fiber (%) | 1.63 [1.60] | 1.70 [1.70] | 2.84 [3.50] |
| Ash (%) | 1.02 [1.16] | 1.22 [1.12] | 6.00 [6.39] |
| Calcium (%) | 0.004 [0.006] | 0.007 [0.006] | 0.27 [0.26] |
| Total Phosphorus (%) | 0.24 [0.27] | 0.27 [0.25] | 0.67 [0.67] |
| Available Acid Phos. (%) | 0.05 | 0.17 | 0.26 |
| Phytic Acid Phosphorus (%) | 0.18 | 0.10 | 0.43 |
| Arginine (%) | 0.34 [0.33] | 0.36 [0.34] | 3.67 [3.55] |
| Cystine (%) | 0.18 [0.17] | 0.18 [0.17] | 0.70 [0.62] |
| Histidine (%) | 0.25 [0.23] | 0.25 [0.24] | 1.18 [1.19] |
| Isoleucine (%) | 0.27 [0.30] | 0.28 [0.29] | 2.55 [2.11] |
| Leucine (%) | 1.09 [1.09] | 1.04 [1.02] | 3.70 [3.56] |
| Lysine (%) | 0.22 [0.23] | 0.23 [0.24] | 3.10 [2.89] |
| Methionine (%) | 0.15 [0.14] | 0.16 [0.15] | 0.71 [0.67] |
| TSAA (%) | 0.33 [0.31] | 0.34 [0.32] | 1.41 |
| Phenylalanine (%) | 0.42 [0.40] | 0.41 [0.39] | 2.64 [2.36] |
| PHE + Tyrosine (%) | 0.65 [0.53] | 0.63 [0.53] | 3.36 [3.79] |
| Threonine (%) | 0.29 [0.31] | 0.29 [0.30] | 1.96 [1.94] |
| Tryptophan (%) | 0.05 [0.07] | 0.06 [0.06] | 0.75 [0.66] |
| Valine (%) | 0.36 [0.41] | 0.39 [0.40] | 2.64 [2.18] |

TABLE 27-continued

Nutrient composition of test ingredients used for feed formulation

| | Yellow Dent Corn (As Is Basis) | Low Phytate (HAP) Corn (As Is Basis) | Soybean Meal (48) (As Is Basis) |
|---|---|---|---|
| Alanine (%) | 0.64 [0.65] | 0.61 [0.62] | [1.97] |
| Aspartic Acid (%) | 0.57 [0.61] | 0.57 [0.60] | [5.89] |
| Glutamic Acid (%) | 1.60 [1.38] | 1.55 [1.29] | [9.07] |
| Glycine (%) | 0.28 [0.29] | 0.30 [0.30] | 2.25 [1.98] |
| Proline (%) | 0.80 [0.78] | 0.81 [0.78] | [2.42] |
| Serine (%) | 0.39 [0.41] | 0.38 [0.40] | [2.52] |

[1]Numbers in brackets represents analyzed values of ingredients following conclusion of the study.

TABLE 28

Ingredient and nutrient compositions of test diets

| Ingredients | Yellow Dent Corn % of diet | Low Phytate Corn % of diet |
|---|---|---|
| Yellow Dent Corn | 53.86 | 0.00 |
| High Available Phos. Corn | 0.00 | 56.68 |
| Soybean Meal (48) | 31.42 | 30.91 |
| Soybean Hulls | 3.00 | 3.00 |
| Anim/Veg Fat | 7.80 | 5.63 |
| Limestone | 1.04 | 1.25 |
| Dicalcium Phos. | 1.70 | 1.36 |
| Salt | 0.49 | 0.49 |
| DL-Methionine | 0.302 | 0.294 |
| L-Threonine | 0.028 | 0.030 |
| L-Lysine HCl | 0.181 | 0.186 |
| Other* | to 100% | |
| Nutrient Composition (As Is Basis): | | |
| Moisture (%) | | 10.67 [11.07][1] | 10.74 [11.43] |
| Metabolizable Energy (kcal/lb) | {1445}[2] | 1445 | 1445 |
| Crude Protein (%) | {20.40} | 20.40 [19.81] | 20.40 [19.73] |
| Crude Fat (%) | | 9.71 [7.74] | 7.81 [8.85] |
| Crude Fiber (%) | | 2.86 [2.20] | 2.93 [2.50] |
| Ash (%) | | 4.88 [4.40] | 4.91 [4.57] |
| Calcium (%) | {0.90} | 0.90 [0.66] | 0.90 [0.67] |
| Total Phosphorus (%) | | 0.68 [0.63] | 0.64 [0.63] |
| Available Phosphorus (%) | {0.45} | 0.45 | 0.45 |
| Phytic Acid Phosphorus (%) | | 0.24 | 0.19 |
| Arginine (%) | {1.30} | 1.35 [1.16] | 1.35 [1.18] |
| Cystine (%) | | 0.32 [0.27] | 0.32 [0.29] |
| Histidine (%) | {0.35} | 0.51 [0.47] | 0.51 [0.47] |
| Isoleucine (%) | {0.80} | 0.95 [0.76] | 0.95 [0.77] |
| Leucine (%) | {1.20} | 1.76 [1.55] | 1.74 [1.60] |
| Lysine (%) | {1.25} | 1.25 [1.06] | 1.25 [1.08] |
| Methionine (%) | {0.50} | 0.60 [0.47] | 0.60 [0.49] |
| TSAA (%) | {0.92} | 0.92 [0.74] | 0.92 [0.78] |
| Phenylalanine (%) | {0.72} | 1.06 [0.88] | 1.05 [0.90] |
| PHE + Tyrosine (%) | {1.34} | 1.41 [1.26] | 1.40 [1.30] |
| Threonine (%) | {0.80} | 0.80 [0.77] | 0.80 [0.78] |
| Tryptophan (%) | {0.20} | 0.27 [0.22] | 0.27 [0.23] |
| Valine (%) | {0.90} | 1.02 [0.86] | 1.04 [0.87] |
| Alanine (%) | | [0.91] | [0.93] |
| Aspartic Acid (%) | | [2.05] | [2.09] |
| Glutamic Acid (%) | | [3.00] | [3.01] |
| Glycine (%) | | [0.77] | [0.77] |

*Other = choline chloride
[1]Numbers in brackets represent analyzed nutrient values.
[2]Numbers in parentheses represents nutrient requirements that diets were formulated to meet or exceed.

TABLE 29

Cholesterol analyses of male broilers YDC or HAP corn diets

| Treatments | Total Cholesterol Content | | |
|---|---|---|---|
| | Breast Meat | Thigh Meat | Abdominal Fat |
| | mg/100 g wet tissue | | |
| Yellow Dent Corn | 48.43[a] | 152.66[a] | 187.04[a] |
| Low Phytate Corn | 43.79[b] | 135.62[b] | 160.65[b] |
| Statistical Analyses: | | | |
| SEM | 0.56 | 1.66 | 2.04 |
| $R^2$ | 0.6536 | 0.7461 | 0.8233 |
| Treatment (Pr > F) | 0.0001 | 0.0001 | 0.0001 |

[a,b]Means with the same letter are not statistically different (P > 0.05).

EXAMPLE 7

A further experiment was conducted to determine the effect of low phytate corn on serum and tissue cholesterol levels in pigs.

Materials & Methods

Sixteen barrows (Iowa Select Farms, PIC genetics) with an average weight of 50 pounds were randomly allotted into two treatment groups and penned individually in an environmentally controlled metabolism room.

Treatments consisted of rations formulated with either normal corn (NC) or low phytate corn (LPC). The nutrient composition of the corn used is listed in Table 30. Diets were fed in a four-phase feeding program: Phase 1 (50 to 120 pounds), Phase 2 (120 to 160 pounds), Phase 3 (160 to 200 pounds), and Phase 4 (200 to 250 pounds). Table 31 lists the ingredient compositions of the test diets. To formulate to equal available phosphorus contents the composition of the Base Mix was altered as shown in Table 32.

Pig weights were recorded and blood samples were collected on the first and last days of the experiment. Feed intake data were collected to determine average daily gain and feed efficiency. Blood samples were analyzed for total cholesterol, HDL and LDL cholesterol and triglyceride content. The trial was terminated when animals reached a market weight of 240 pounds. All pigs were slaughtered and processed at Iowa State University Meats Laboratory. Loin, backfat, and shoulder samples were collected for cholesterol and fatty acid analysis.

TABLE 30

Nutrient composition of normal corn and low phytate corn

| Nutrient | Normal Corn | Low Phytate Corn |
|---|---|---|
| Dry Matter, % | 88.80 | 88.84 |
| Crude Protein, % | 9.16 | 9.20 |
| Crude Fat, % | 3.53 | 3.34 |
| Calcium, % | 0.005 | 0.004 |
| Phosphorus, % | 0.27 | 0.27 |
| Starch, % | 69.15 | 69.20 |

TABLE 31

Ingredient content of diets by phase

| Diet Phase | Normal corn | Low Phytate Corn |
|---|---|---|
| Phase 1 (50 to 120 lbs) | | |
| Normal Corn, % | 73.0 | 0.0 |
| Low Phytate Corn, % | 0.0 | 73.5 |
| Soybean Meal, % | 24.0 | 24.0 |
| M-P Base H-L, % | 3.0 | 2.5 |
| Phase 2 (120 to 160 lbs) | | |
| Normal Corn, % | 80.0 | 0.0 |
| Low Phytate Corn, % | 0.0 | 80.5 |
| Soybean Meal, % | 17.3 | 17.3 |
| M-P Base H-L, % | 2.7 | 2.2 |
| Phase 3 (160 to 200 lbs) | | |
| Normal Corn, % | 82.8 | 0.0 |
| Low Phytate Corn, % | 0.0 | 83.3 |
| Soybean Meal, % | 14.7 | 14.7 |
| M-P Base H-L, % | 2.5 | 2.0 |
| Phase 4 (200 to 250 lbs) | | |
| Normal Corn, % | 85.0 | 0.0 |
| Low Phytate Corn, % | 0.0 | 85.6 |
| Soybean Meal, % | 12.8 | 12.7 |
| M-P Base H-L, % | 2.2 | 1.7 |

TABLE 32

Ingredient Composition of M-P Base H-L

| | Phase 1 | | Phase 2 | | Phase 3 | | Phase 4 | |
|---|---|---|---|---|---|---|---|---|
| Ingredient, % | NC | LPC | NC | LPC | NC | LPC | NC | LPC |
| Dical, 18.5% | 50.0 | 40.0 | 50.0 | 36.7 | 50.0 | 35.9 | 50.0 | 20.6 |
| M-P Vitamin Pak | 2.9 | 3.5 | 2.9 | 3.6 | 2.9 | 3.7 | 2.9 | 3.3 |
| Limestone | 30.1 | 36.1 | 30.1 | 38.1 | 30.1 | 38.6 | 35.1 | 62.3 |
| L-Lysine | 5.0 | 6.0 | 5.0 | 6.3 | 5.0 | 6.4 | — | — |
| Salt | 10.0 | 12.0 | 10.0 | 12.7 | 10.0 | 12.8 | 10.0 | 11.4 |
| Trace Mineral | 2.0 | 2.4 | 2.0 | 2.5 | 2.0 | 2.6 | 2.0 | 2.3 |

Results and Discussion

Calculated dietary nutrient compositions are shown in Table 33. Diets were formulated to contain equal available phosphorus and amino acid contents across diets within a feeding phase. In addition, there was the intention keep calcium content constant across diets with a phase; however the diets were formulated to have equal ratios of calcium to total phosphorus contents. This resulted in a 0.10% reduction in both calcium and phosphorus in the low phytate corn diets when compared to the normal corn diets.

TABLE 33

Calculated compositions of Diets and ratios of calcium to total phosphorus (Ca:TP) and calcium to available phosphorus (Ca:Avail P)

| Diet Phase | Crude Protein | Calcium | Total Phosphorus | Available Phosphorus | Ca:TP | Ca:Avail P | Lysine |
|---|---|---|---|---|---|---|---|
| Phase 1 | | | | | | | |
| Normal Corn | 17.6 | .80 | .59 | .36 | 1.33 | 2.20 | 1.02 |
| Low Phytate Corn | 17.6 | .69 | .50 | .36 | 1.38 | 1.89 | 1.02 |
| Phase 2 | | | | | | | |
| Normal Corn | 15.0 | .70 | .54 | .32 | 1.29 | 2.20 | .82 |
| Low Phytate Corn | 15.0 | .59 | .44 | .32 | 1.34 | 1.83 | .83 |
| Phase 3 | | | | | | | |
| Normal Corn | 14.0 | .64 | .51 | .30 | 1.26 | 2.20 | .74 |
| Low Phytate Corn | 14.0 | .53 | .42 | .30 | 1.28 | 1.75 | .75 |
| Phase 4 | | | | | | | |
| Normal Corn | 13.3 | .61 | .48 | .27 | 1.28 | 2.30 | .60 |
| Low Phytate Corn | 13.3 | .49 | .34 | .23 | 1.43 | 2.09 | .60 |

The proximate analysis of the rations fed in each phase are shown in Table 34. Calcium and phosphorus concentrations of all diets were one and one half to more than three times greater than the calculated values. In addition, calcium concentration in the LPC diets in Phases 1 and 2 were almost twice that of calcium levels in the NC corn diets and the total phosphorus concentration in the low phytate diets were greater than in the normal corn diets. These results are based on either formulation error or analytical error and are of sufficient magnitude to impact animal growth.

0.74 and 0.60. Analyzed concentrations in the normal and low phytate corn diets were 1.11/0.93, 1.01/1.30, 0.85/0.85, 0.89/0.74 respectively in Phases 1 through 4. The concentrations of other amino acids follow the same pattern suggesting imprecision in feed manufacturing. Assuming the target lysine concentrations are good estimates of the lysine requirement of the pigs, lysine is provided in excess of the requirement in each phase except Phase 1 when the lysine concentration is approximately 91% of the target. This reduced lysine concentration in Phase 1 would be expected

TABLE 34

Analyzed nutrient contents of diets by phase (All results are on a dry matter basis)

| | Nutrient % | | | | | | |
|---|---|---|---|---|---|---|---|
| Diet Phase | Moisture | Crude Protein | Crude Fiber | Crude Fat | Ash | Calcium | Phosphorus |
| Phase 1 | | | | | | | |
| Normal Corn | 7.77 | 21.24 | 2.39 | 2.75 | 7.96 | 1.45 | 0.98 |
| Low Phytate Corn | 7.47 | 17.95 | 2.27 | 2.33 | 11.97 | 2.40 | 1.06 |
| Phase 2 | | | | | | | |
| Normal Corn | 5.81 | 20.01 | 2.44 | 2.52 | 6.13 | 1.03 | 0.71 |
| Low Phytate Corn | 5.97 | 21.67 | 1.70 | 2.17 | 10.95 | 2.19 | 1.21 |
| Phase 3 | | | | | | | |
| Normal Corn | 13.01 | 17.25 | 2.64 | 3.53 | 6.04 | 1.13 | 0.80 |
| Low Phytate Corn | 12.21 | 17.20 | 2.96 | 3.28 | 8.16 | 1.38 | 0.91 |
| Phase 4 | | | | | | | |
| Normal Corn | 6.66 | 15.78 | 2.68 | 3.18 | 3.78 | 0.75 | 0.46 |
| Low Phytate Corn | 6.02 | 18.01 | 2.87 | 2.85 | 4.96 | 0.87 | 0.70 |

The amino acid concentrations of the diets are shown in Table 35. Lysine concentrations targeted were 1.02, 0.82, to significantly reduce growth rate and the efficiency of feed utilization.

TABLE 35

Amino acid content of diets (All values are on a dry matter basis)

|  | Normal Corn | | | | Low Phytate Corn | | | |
| --- | --- | --- | --- | --- | --- | --- | --- | --- |
| Amino Acid, % | Phase 1 | Phase 2 | Phase 3 | Phase 4 | Phase 1 | Phase 2 | Phase 3 | Phase 4 |
| Tryptophan | 0.25 | 0.21 | 0.17 | 0.17 | 0.19 | 0.24 | 0.18 | 0.15 |
| Aspartic Acid | 2.15 | 1.95 | 1.61 | 1.76 | 1.72 | 2.21 | 1.59 | 1.48 |
| Threonine | 0.83 | 0.76 | 0.66 | 0.68 | 0.68 | 0.83 | 0.64 | 0.59 |
| Serine | 1.12 | 1.04 | 0.90 | 0.89 | 0.91 | 1.12 | 0.87 | 0.82 |
| Glutamic Acid | 3.83 | 3.61 | 3.07 | 2.68 | 3.16 | 3.84 | 2.97 | 2.28 |
| Proline | 1.33 | 1.25 | 1.13 | 1.24 | 1.15 | 1.31 | 1.12 | 1.14 |
| Glycine | 0.87 | 0.74 | 0.64 | 0.68 | 0.70 | 0.83 | 0.64 | 0.59 |
| Alanine | 1.14 | 1.05 | 0.95 | 0.97 | 0.92 | 1.06 | 0.92 | 0.89 |
| Cystine | 0.30 | 0.30 | 0.28 | 0.32 | 0.27 | 0.31 | 0.26 | 0.30 |
| Valine | 0.89 | 0.82 | 0.69 | 0.82 | 0.73 | 0.88 | 0.69 | 0.60 |
| Methionine | 0.26 | 0.27 | 0.23 | 0.27 | 0.22 | 0.26 | 0.22 | 0.25 |
| Isoleucine | 0.78 | 0.71 | 0.59 | 0.70 | 0.63 | 0.78 | 0.58 | 0.48 |
| Leucine | 1.86 | 1.79 | 1.60 | 1.68 | 1.57 | 1.78 | 1.53 | 1.47 |
| Tyrosine | 0.43 | 0.39 | 0.34 | 0.35 | 0.36 | 0.44 | 0.35 | 0.30 |
| Phenylalanine | 0.99 | 0.93 | 0.79 | 0.84 | 0.81 | 0.99 | 0.76 | 0.70 |
| Histidine | 0.54 | 0.49 | 0.44 | 0.50 | 0.44 | 0.53 | 0.42 | 0.43 |
| Lysine | 1.11 | 1.01 | 0.85 | 0.89 | 0.93 | 1.30 | 0.84 | 0.74 |
| Arginine | 1.17 | 1.05 | 0.86 | 0.97 | 0.93 | 1.19 | 0.85 | 0.32 |

Serum cholesterol concentrations were determined on Days 0 and 81 are shown in Table 36. Concentrations of all lipid classes measured were similar on Day 0 between the Normal Corn and Low Phytate Corn fed pigs. There was no effect of diet on serum lipid concentrations on Day 81.

TABLE 36

Blood Cholesterol Analysis

|  | Day 0 | | | Day 81 | | |
| --- | --- | --- | --- | --- | --- | --- |
| Lipid Class | Normal Corn | Low Phytate Corn | SEM | Normal Corn | Low Phytate Corn | SEM |
| Triglycerides, mg/dl | 26.0 | 22.4 | 1.84 | 32.0 | 32.1 | 2.15 |
| Total Cholesterol, mg/dl | 89.9 | 91.5 | 4.02 | 101.3 | 104.4 | 5.06 |
| HDL Cholesterol, mg/dl | 37.2 | 36,6 | 1.14 | 37.9 | 35.9 | 1.33 |
| LDL Cholesterol, mg/dl | 47.6 | 50.5 | 3.53 | 57.0 | 62.3 | 3.82 |
| Total Cholesterol: HDL Cholesterol | 2.4 | 2.5 | 2.53 | 2.7 | 2.9 | 0.08 |

Tissue cholesterol results are shown in Table 37. Cholesterol levels did not differ significantly between NC and LPC in shoulder tissue. The magnitude of reduction in total cholesterol of 3.4% is similar to the reduction observed in poultry tissues. Additional replications would be required to statistically differentiate this magnitude of reduction.

TABLE 37

Tissue Cholesterol Analysis

Total Cholesterol, mg/g

| Tissue | Normal Corn | Low Phytate Corn | SEM |
| --- | --- | --- | --- |
| Shoulder | 0.59 | 0.57 | 0.01 |

EXAMPLE 8

An experiment was conducted to evaluate the ability of young growing broiler chickens to utilize the phosphorus in Low4 soybean meal (Low4 SBM) with normal phytate SBM (Check SBM), both with or without yellow dent corn (YDC) or low phytate (LPC: high available phosphorus) corn. Dietary available phosphorus (P) requirement are examined along with the extent of how P excretion is influenced by the two low phytate P grain sources. Subsequent evaluation of meat total cholesterol was examined for possible effects on these values.

Materials and Methods

Fifteen hundred male broiler chicks of a commercial strain were obtained at hatch to ensure 1440 healthy males were available for the start of the study. Twelve males were placed in each cage, providing a density of 0.40 ft$^2$ per broiler. Each treatment was fed to 10 replications (cages.). Birds were given feed and water ad-libitum. The broilers were on the test diets from 0 to 35 days of age. The two phases were starter (0–21 days of age) and grower (21–35 days of age). Due to a limited amount of each soybean meal source, the trial was terminated at day 35 rather than proceeding closer to market age.

Sources for the LPC and YDC were the PLNC'96 quantities. Both the Check SBM and Low4 SBM came from soybeans grown the same year at the same location and then processed into soybean meal at the same processing plant. The two SBM have been previous characterized in other poultry studies with their reference codes being S981212 (Check SBM) and S981240 (Low4 SBM). Nutrient matrixes for the ingredients are listed in Table 38.

Starter and grower diets were formulated using least cost feed formulation so as to provide a 2 (YDC; LPC)×2 (Check SBM; Low4 SBM)×3 (0.35%; 0.40%; 0.45% dietary available P) factorial experiment with a total of 12 treatments. The three available P levels provided two deficient levels with the third (highest) level representing the requirement based on NRC (1994) recommendations. The dietary available P levels were adjusted downward for the grower phase. With the exception of dietary available P level, all other nutrients either met or exceeded NRC (1994) recommendations with consideration for industry standards. Ingredient listings and nutrient compositions of the test diets are provided in Tables 39 to 46.

Measurements taken during the study were live weights (day 21 and 35), feed intake for each period, mortality (number and weight), tibia dry weight/ash and excreta collection (day 20 and 35). Cholesterol (CHL) analyses was determined on the thigh and breast meat samples but only from broilers fed the adequate available P level for each corn and SBM source (YDC/Check SBM; YDC/Low4 SBM; LPC/Check SBM; and LPC/Low4 SBM). Due to cost constraints, it was decided not to examine the CHL content of meat samples from broilers fed the lower dietary available P levels across all corn and soybean meal sources.

Results

Thigh and Breast Meat Total Cholesterol (Table 47)

Total CHL content of the thigh meat was significantly (P<0.05) influenced by the treatments fed in this study. There was no difference in thigh meat CHL levels of broilers fed the YDC/Check SBM or YDC/Low4 SBM, even though the combination of Low4 with YDC numerically (5.3%) reduced the total CHL content of the thigh meat. Utilizing the LPC source instead of YDC with the Check SBM significantly decreased total CHL compared to thigh meat from broilers fed the YDC/Check SBM, with a reduction of about 10.1%. The lowest thigh meat CHL content came from birds which had been fed the LPC/Low4 SBM diet during the study which was significant from the control and YDC/

Low4 treatments. Feeding this diet led to a 14.1% reduction in thigh meat CHL compared to the broilers fed the control diet (YDC/Check SBM).

Breast meat CHL was also significantly influenced by the diets fed in this study. Supplying either low phytate product in the diet led to significantly lower breast meat CHL content compared to those fed the control diet (YDC/Check SBM). A 10% reduction was obtained by utilizing either low phytate source in the diet. When the LPC and Low4 SBM were combined in the same diet, total CHL content of the breast meat was significantly reduced even further. By comparing the CHL level of broilers fed this diet to that of the control, there was an 18.3% reduction for breast meat CHL.

TABLE 38

Nutrient composition (as is basis) of test ingredients for feed formulation

| Nutrient | Yellow Dent Corn | Low Phytate Corn | Check Soybean Meal | Low4 Soybean Meal |
|---|---|---|---|---|
| | PLNC'96 | PLVC'96 | S981212 | S981240 |
| Moisture (%) | 9.72 [13.04][1] | 12.93 [12.20][1] | 4.11 [10.10][1] | 4.57 [10.54][1] |
| TMEn (kcal/lb) | 1627 | 1625 | 1130* | 1130* |
| Crude Protein (%) | 7.59 [7.28] | 8.64 [8.69] | 53.77 [49.67] | 55.24 [51.51] |
| Crude Fat (%) | 3.81 [3.67] | 3.60 [3.78] | 0.94 [1.46] | 0.57 [0.73] |
| Crude Fiber (%) | 1.90 [1.60] | 1.70 [1.50] | 4.52 [3.60] | 2.34 [2.70] |
| Ash (%) | 1.11 [1.09] | 1.22 [1.08] | 6.25 [6.45] | 6.72 [6.92] |
| Calcium (%) | 0.005 [0.007] | 0.007 [0.006] | 0.27 [0.32] | 0.27 [0.32] |
| Total Phos. (%) | 0.24 [0.24] | 0.27 [0.25] | 0.70 [0.67] | 0.78 [0.75] |
| Avail. Phos. (%) | 0.048 | 0.17 | 0.22 | 0.56 |
| Phytic Acid Phos. (%) | 0.192 | 0.10 | 0.48 | 0.22 |
| Arginine (%) | 0.33 [0.32] | 0.36 [0.34] | 3.76 [3.36] | 4.01 [3.52] |
| Cystine (%) | 0.16 [0.16] | 0.18 [0.16] | 0.65 [0.58] | 0.64 [0.58] |
| Histidine (%) | 0.20 [0.19] | 0.25 [0.24] | 1.32 [1.14] | 1.41 [1.20] |
| Isoleucine (%) | 0.24 [0.24] | 0.28 [0.30] | 2.18 [2.08] | 2.21 [2.15] |
| Leucine (%) | 0.90 [0.79] | 1.04 [1.04] | 3.91 [3.57] | 4.05 [3.69] |
| Lysine (%) | 0.24 [0.24] | 0.23 [0.23] | 2.93 [2.63] | 3.03 [2.67] |
| Methionine (%) | 0.16 [0.16] | 0.16 [0.15] | 0.72 [0.65] | 0.76 [0.67] |
| TSAA (%) | 0.32 [0.32] | 0.34 [0.31] | 1.37 [1.23] | 1.40 [1.25] |
| Phenylalanine (%) | 0.34 [0.32] | 0.41 [0.41] | 2.60 [2.34] | 2.68 [2.39] |
| PHE + Tyrosine (%) | 0.47 [0.45] | 0.63 [0.56] | 4.20 [3.75] | 4.34 [3.85] |
| Threonine (%) | 0.29 [0.26] | 0.29 [0.31] | 2.19 [1.97] | 2.31 [2.05] |
| Tryptophan (%) | 0.05 [0.05] | 0.06 [0.06] | 0.76 [0.71] | 0.80 [0.70] |
| Valine (%) | 0.34 [0.33] | 0.39 [0.41] | 2.22 [2.20] | 2.22 [2.28] |
| Alanine (%) | 0.42 [0.50] | 0.61 [0.63] | 2.20 [2.04] | 2.38 [2.16] |
| Aspartic Acid (%) | 0.57 [0.51] | 0.57 [0.62] | 6.21 [5.78] | 6.46 [5.95] |
| Glutamic Acid (%) | 1.23 [1.25] | 1.55 [1.61] | 8.58 [8.97] | 8.95 [9.27] |
| Glycine (%) | 0.31 [0.29] | 0.30 [0.31] | 2.21 [2.01] | 2.28 [2.05] |
| Proline (%) | 0.67 [0.62] | 0.81 [0.78] | 2.65 [2.44] | 2.69 [2.49] |
| Serine (%) | 0.38 [0.34] | 0.38 [0.41] | 2.88 [2.53] | 3.02 [2.61] |

[1]Numbers in brackets represent analyzed values of test ingredients at conclusion of study.
*The actual TMEn (As Is Basis) values for Check SBM = 1054 kcal/lb and for Low4 SBM, the value is 1124 kcal/lb.

TABLE 39

Ingredient composition of starter diets (0–21 days of age)

| Nutrient | YDC/Check SBM | | | YDC/Low4 SBM | | |
|---|---|---|---|---|---|---|
| | 0.35/0.30[1] | 0.40/0.35 | 0.45/0.40 | 0.35/0.30 | 0.40/0.35 | 0.45/0.40 |
| Yellow Dent Corn | 61.37 | 61.16 | 60.96 | 62.96 | 62.76 | 62.56 |
| Check Soybean Meal | 31.32 | 31.35 | 31.38 | — | — | — |
| Low4 Soybean Meal | — | — | — | 30.28 | 30.31 | 30.33 |
| Animal/Veg. Fat | 3.50 | 3.57 | 3.65 | 3.15 | 3.22 | 3.30 |
| Limestone | 1.35 | 1.20 | 1.05 | 1.66 | 1.51 | 1.36 |
| Dicalcium Phosphate | 1.26 | 1.51 | 1.76 | 0.75 | 1.00 | 1.25 |
| DL-Methionine | 0.31 | 0.31 | 0.31 | 0.31 | 0.31 | 0.31 |
| L-Lysine HCl | 0.24 | 0.23 | 0.23 | 0.23 | 0.23 | 0.23 |
| Trace Minerals | | | 0.075% | | | |
| Vitamin Premix | | | 0.025% | | | |
| Other* | | | to 100% | | | |

*Other = Salt and choline chloride.
[1]The first number represents the available P level in the starter diet while the second number represents the available P level for the corresponding grower diet.

TABLE 40

Ingredient composition of starter diets (0–21 days of age)

| Nutrient | LPC/Check SBM | | | LPC/Low4 SBM | | |
|---|---|---|---|---|---|---|
| | 0.35/0.30[1] | 0.40/0.35 | 0.45/0.40 | 0.35/0.30 | 0.40/0.35 | 0.45/0.40 |
| Low Phytate Corn | 64.03 | 63.82 | 63.60 | 65.60 | 65.39 | 65.18 |
| Check Soybean Meal | 29.58 | 29.62 | 29.65 | — | — | — |
| Low4 Soybean Meal | — | — | — | 28.55 | 28.59 | 28.62 |
| Animal/Veg. Fat | 2.66 | 2.74 | 2.82 | 2.31 | 2.39 | 2.47 |
| Limestone | 1.59 | 1.43 | 1.28 | 1.89 | 1.74 | 1.58 |
| Dicalcium Phosphate | 0.88 | 1.13 | 1.38 | 0.39 | 0.64 | 0.90 |
| DL-Methionine | 0.31 | 0.31 | 0.31 | 0.31 | 0.31 | 0.31 |
| L-Lysine HCl | 0.30 | 0.30 | 0.30 | 0.30 | 0.30 | 0.30 |
| Trace Minerals | 0.075% | | | | | |
| Vitamin Premix | 0.025% | | | | | |
| Other* | to 100% | | | | | |

*Other = Salt and choline chloride.
[1]The first number represents the available P level in the starter diet while the second number represents the available P level for the corresponding grower diet.

TABLE 41

Ingredient composition of grower diets (22–35 days of age)

| Nutrient | YDC/Check SBM | | | YDC/Low4 SBM | | |
|---|---|---|---|---|---|---|
| | 0.35/0.30[1] | 0.40/0.35 | 0.45/0.40 | 0.35/0.30 | 0.40/0.35 | 0.45/0.40 |
| Yellow Dent Corn | 65.73 | 65.53 | 65.32 | 67.12 | 66.92 | 66.72 |
| Check Soybean Meal | 27.31 | 27.34 | 27.37 | — | — | — |
| Low4 Soybean Meal | — | — | — | 26.40 | 26.43 | 26.46 |
| Animal/Veg. Fat | 3.52 | 3.59 | 3.67 | 3.21 | 3.29 | 3.36 |
| Limestone | 1.38 | 1.22 | 1.07 | 1.65 | 1.50 | 1.35 |
| Dicalcium Phosphate | 1.04 | 1.29 | 1.54 | 0.60 | 0.85 | 1.10 |
| DL-Methionine | 0.27 | 0.27 | 0.27 | 0.27 | 0.27 | 0.27 |
| L-Lysine HCl | 0.18 | 0.18 | 0.18 | 0.18 | 0.18 | 0.18 |
| Trace Minerals | 0.75% | | | | | |
| Vitamin Premix | 0.25% | | | | | |
| Other* | to 100% | | | | | |

*Other = Salt and choline chloride.
[1]The first number represents the available P level in the starter diet while the second number represents the available P level for the corresponding grower diet.

TABLE 42

Ingredient composition of grower diets (22–35 days of age)

| Nutrient | LPC/Check SBM | | | LPC/Low4 SBM | | |
|---|---|---|---|---|---|---|
| | 0.35/0.30[1] | 0.40/0.35 | 0.45/0.40 | 0.35/0.30 | 0.40/0.35 | 0.45/0.40 |
| Low Phytate Corn | 68.58 | 68.37 | 68.16 | 69.93 | 69.72 | 69.51 |
| Check Soybean Meal | 25.44 | 25.48 | 25.52 | — | — | — |
| Low4 Soybean Meal | — | — | — | 24.56 | 24.59 | 24.63 |
| Animal/Veg. Fat | 2.62 | 2.70 | 2.78 | 2.32 | 2.40 | 2.48 |
| Limestone | 1.63 | 1.48 | 1.33 | 1.89 | 1.74 | 1.59 |
| Dicalcium Phosphate | 0.64 | 0.89 | 1.14 | 0.22 | 0.47 | 0.72 |
| DL-Methionine | 0.27 | 0.27 | 0.27 | 0.27 | 0.27 | 0.27 |
| L-Lysine HCl | 0.25 | 0.25 | 0.25 | 0.25 | 0.25 | 0.25 |
| Trace Minerals | 0.75% | | | | | |
| Vitamin Premix | 0.25% | | | | | |
| Other* | to 100% | | | | | |

*Other = Salt and choline chloride.
[1]The first number represents the available P level in the starter diet while the second number represents the available P level for the corresponding grower diet.

TABLE 43

Calculated and analyzed nutrient composition (as is basis) of starter diets (0–21 days of age)

| | YDC/Check SBM | | | YDC/Low4 SBM | | |
|---|---|---|---|---|---|---|
| Nutrient | 0.35/0.30[1] | 0.40/0.35 | 0.45/0.40 | 0.35/0.30[1] | 0.40/0.35 | 0.45/0.40 |
| Moisture (%) | 7.33 | 7.31 | 7.30 | 7.57 | 7.55 | 7.54 |
| M.E. (kcal/lb) | 1429 | 1429 | 1429 | 1429 | 1429 | 1429 |
| Crude Protein (%) | 21.90 | 21.9 | 21.90 | 21.90 | 21.90 | 21.90 |
| Crude Fat (%) | 6.06 | 6.12 | 6.19 | 5.65 | 5.72 | 5.79 |
| Crude Fiber (%) | 2.58 | 2.58 | 2.58 | 1.90 | 1.90 | 1.90 |
| Ash (%) | 5.01 | 5.07 | 5.13 | 5.00 | 5.05 | 5.11 |
| Calcium (%) | 0.90 | 0.90 | 0.90 | 0.90 | 0.90 | 0.90 |
| Total Phos. (%) | 0.62 | 0.67 | 0.72 | 0.54 | 0.59 | 0.64 |
| Avail. Phos. (%) | 0.35 | 0.40 | 0.45 | 0.35 | 0.40 | 0.45 |
| Phytic Acid Phos. (%) | 0.27 | 0.27 | 0.27 | 0.19 | 0.19 | 0.19 |
| Arginine (%) | 1.38 | 1.38 | 1.38 | 1.42 | 1.42 | 1.42 |
| Cystine (%) | 0.30 | 0.30 | 0.30 | 0.29 | 0.29 | 0.29 |
| Histidine (%) | 0.54 | 0.54 | 0.54 | 0.55 | 0.55 | 0.55 |
| Isoleucine (%) | 0.83 | 0.83 | 0.83 | 0.82 | 0.82 | 0.82 |
| Leucine (%) | 1.78 | 1.76 | 1.78 | 1.79 | 1.79 | 1.79 |
| Lysine (%) | 1.25 | 1.25 | 1.25 | 1.25 | 1.25 | 1.25 |
| Methionine (%) | 0.63 | 0.63 | 0.63 | 0.64 | 0.64 | 0.64 |
| TSAA (%) | 0.93 | 0.93 | 0.93 | 0.93 | 0.93 | 0.93 |
| Phenylalanine (%) | 1.02 | 1.02 | 1.02 | 1.03 | 1.03 | 1.03 |
| PHE + Tyrosine (%) | 1.60 | 1.60 | 1.60 | 1.61 | 1.61 | 1.61 |
| Threonine (%) | 0.86 | 0.86 | 0.86 | 0.88 | 0.88 | 0.88 |
| Tryptophan (%) | 0.27 | 0.27 | 0.27 | 0.27 | 0.27 | 0.27 |
| Valine (%) | 0.90 | 0.90 | 0.90 | 0.89 | 0.89 | 0.58 |
| Alanine (%) | | | | | | |
| Aspartic Acid (%) | | | | | | |
| Glutamic Acid (%) | | | | | | |
| Glycine (%) | | | | | | |
| Proline (%) | | | | | | |
| Serine (%) | | | | | | |

[1]The firat number represents the available P level in the ssrter diet while the second number represents the available P level for the corresponding grower diet.

TABLE 44

Calculated and analyzed nutrient composition (as is basis) of other starter diets (0–21 days of age)

| | LPC/Check SBM | | | LPC/Low4 SBM | | |
|---|---|---|---|---|---|---|
| Nutrient | 0.35/0.30[1] | 0.40/0.35 | 0.45/0.40 | 0.35/0.30[1] | 0.40/0.35 | 0.45/0.40 |
| Moisture (%) | 9.56 | 9.53 | 9.52 | 9.84 | 9.82 | 9.80 |
| M.E. (kcal/lb) | 1429 | 1429 | 1429 | 1429 | 1429 | 1429 |
| Crude Protein (%) | 21.90 | 21.90 | 21.90 | 21.90 | 21.90 | 21.90 |
| Crude Fat (%) | 5.19 | 5.26 | 5.33 | 4.79 | 4.86 | 4.93 |
| Crude Fiber (%) | 2.43 | 2.42 | 2.42 | 1.78 | 1.78 | 1.78 |
| Ash (%) | 4.92 | 4.98 | 5.04 | 4.91 | 4.96 | 5.02 |
| Calcium (%) | 0.90 | 0.90 | 0.90 | 0.90 | 0.90 | 0.90 |
| Total Phos. (%) | 0.56 | 0.61 | 0.66 | 0.48 | 0.53 | 0.58 |
| Avail. Phos. (%) | 0.35 | 0.40 | 0.45 | 0.35 | 0.40 | 0.45 |
| Phytic Acid Phos. (%) | 0.21 | 0.21 | 0.21 | 0.13 | 0.13 | 0.13 |
| Arginine (%) | 1.34 | 1.34 | 1.34 | 1.38 | 1.38 | 1.38 |
| Cystine (%) | 0.31 | 0.31 | 0.31 | 0.30 | 0.30 | 0.30 |
| Histidine (%) | 0.55 | 0.55 | 0.55 | 0.57 | 0.57 | 0.57 |
| Isoleucine (%) | 0.82 | 0.82 | 0.82 | 0.81 | 0.81 | 0.82 |
| Leucine (%) | 1.82 | 1.82 | 1.82 | 1.84 | 1.84 | 1.84 |
| Lysine (%) | 1.25 | 1.25 | 1.25 | 1.25 | 1.25 | 1.25 |
| Methionine (%) | 0.62 | 0.62 | 0.62 | 0.63 | 0.63 | 0.63 |
| TSAA (%) | 0.93 | 0.93 | 0.93 | 0.93 | 0.93 | 0.93 |
| Phenylalanine (%) | 1.03 | 1.03 | 1.03 | 1.03 | 1.03 | 1.03 |
| PHE + Tyrosine (%) | 1.65 | 1.64 | 1.65 | 1.65 | 1.65 | 1.65 |
| Threonine (%) | 0.83 | 0.83 | 0.83 | 0.85 | 0.85 | 0.85 |

TABLE 44-continued

Calculated and analyzed nutrient composition (as is basis) of other starter diets
(0–21 days of age)

| Nutrient | LPC/Check SBM | | | LPC/Low4 SBM | | |
|---|---|---|---|---|---|---|
| | 0.35/0.30[1] | 0.40/0.35 | 0.45/0.40 | 0.35/0.30[1] | 0.40/0.35 | 0.45/0.40 |
| Tryptophan (%) | 0.26 | 0.26 | 0.26 | 0.27 | 0.27 | 0.27 |
| Valine (%) | 0.91 | 0.91 | 0.91 | 0.89 | 0.89 | 0.89 |
| Alanine (%) | | | | | | |
| Aspartic Acid (%) | | | | | | |
| Glutamic Acid (%) | | | | | | |
| Glycine (%) | | | | | | |
| Proline (%) | | | | | | |
| Serine (%) | | | | | | |

[1]The first number represents the available P level in the starter diet while the second number represents the available P level for the corresponding grower diet.

TABLE 45

Calculated and analyzed nutrient composition (as is basis) of grower diets
(22–35 days of age)

| Nutrient | YDC/Check SBM | | | YDC/Low4 SBM | | |
|---|---|---|---|---|---|---|
| | 0.35/0.30[1] | 0.40/0.35 | 0.45/0.40 | 0.35/0.30[1] | 0.40/0.35 | 0.45/0.40 |
| Moisture (%) | 7.58 | 7.56 | 7.55 | 7.79 | 7.78 | 7.76 |
| M.E. (kcal/lb) | 1451 | 1451 | 1451 | 1451 | 1451 | 1451 |
| Crude Protein (%) | 20.0 | 20.0 | 20.0 | 20.0 | 20.0 | 20.0 |
| Crude Fat (%) | 6.21 | 6.27 | 6.34 | 5.85 | 5.92 | 5.99 |
| Crude Fiber (%) | 2.48 | 2.48 | 2.48 | 1.89 | 1.89 | 1.89 |
| Ash (%) | 4.66 | 4.72 | 4.78 | 4.64 | 4.70 | 4.76 |
| Calcium (%) | 0.85 | 0.85 | 0.85 | 0.85 | 0.85 | 0.85 |
| Total Phos. (%) | 0.56 | 0.61 | 0.66 | 0.49 | 0.54 | 0.59 |
| Avail. Phos. (%) | 0.30 | 0.35 | 0.40 | 0.30 | 0.35 | 0.40 |
| Phytic Acid Phos. (%) | 0.26 | 0.26 | 0.26 | 0.19 | 0.19 | 0.19 |
| Arginine (%) | 1.24 | 1.24 | 1.24 | 1.28 | 1.28 | 1.28 |
| Cystine (%) | 0.28 | 0.28 | 0.28 | 0.28 | 0.28 | 0.28 |
| Histidine (%) | 0.49 | 0.49 | 0.49 | 0.51 | 0.51 | 0.51 |
| Isoleucine (%) | 0.75 | 0.75 | 0.75 | 0.74 | 0.74 | 0.74 |
| Leucine (%) | 1.66 | 1.66 | 1.66 | 1.67 | 1.67 | 1.67 |
| Lysine (%) | 1.10 | 1.10 | 1.10 | 1.10 | 1.10 | 1.10 |
| Methionine (%) | 0.57 | 0.57 | 0.57 | 0.57 | 0.57 | 0.57 |
| TSAA (%) | 0.85 | 0.85 | 0.85 | 0.85 | 0.85 | 0.85 |
| Phenylalanine (%) | 0.93 | 0.93 | 0.93 | 0.94 | 0.94 | 0.94 |
| PHE + Tyrosine (%) | 1.46 | 1.46 | 1.46 | 1.46 | 1.46 | 1.46 |
| Threonine (%) | 0.79 | 0.79 | 0.79 | 0.80 | 0.80 | 0.80 |
| Tryptophan (%) | 0.24 | 0.24 | 0.24 | 0.24 | 0.24 | 0.24 |
| Valine (%) | 0.83 | 0.83 | 0.83 | 0.81 | 0.81 | 0.81 |
| Alanine (%) | | | | | | |
| Aspartic Acid (%) | | | | | | |
| Glutamic Acid (%) | | | | | | |
| Glycine (%) | | | | | | |
| Proline (%) | | | | | | |
| Serine (%) | | | | | | |

[1]The first number represents the available P level in the starter diet while the second number represents the available P level for the corresponding grower diet

TABLE 46

Calculated and analyzed nutrient composition (as is basis) of other grower diets
(22–35 days of age)

| Nutrient | LPC/Check SBM | | | LPC/Low4 SBM | | |
|---|---|---|---|---|---|---|
| | 0.35/0.30[1] | 0.40/0.35 | 0.45/0.40 | 0.35/0.30[1] | 0.40/0.35 | 0.45/0.40 |
| Moisture (%) | 9.97 | 9.95 | 9.93 | 10.22 | 10.19 | 10.17 |
| M.E. (kcal/lb) | 1451 | 1451 | 1451 | 1451 | 1451 | 1451 |
| Crude Protein (%) | 20.0 | 20.0 | 20.0 | 20.0 | 20.0 | 20.0 |
| Crude Fat (%) | 5.28 | 5.35 | 5.42 | 4.93 | 5.00 | 5.07 |
| Crude Fiber (%) | 2.32 | 2.31 | 2.31 | 1.76 | 1.76 | 1.76 |
| Ash (%) | 4.56 | 4.62 | 4.68 | 4.55 | 4.61 | 4.66 |

TABLE 46-continued

Calculated and analyzed nutrient composition (as is basis) of other grower diets
(22–35 days of age)

| | LPC/Check SBM | | | LPC/Low4 SBM | | |
|---|---|---|---|---|---|---|
| Nutrient | 0.35/0.30[1] | 0.40/0.35 | 0.45/0.40 | 0.35/0.30[1] | 0.40/0.35 | 0.45/0.40 |
| Calcium (%) | 0.85 | 0.85 | 0.85 | 0.85 | 0.85 | 0.85 |
| Total Phos. (%) | 0.49 | 0.54 | 0.59 | 0.42 | 0.47 | 0.52 |
| Avail. Phos. (%) | 0.30 | 0.35 | 0.40 | 0.30 | 0.35 | 0.40 |
| Phytic Acid Phos. (%) | 0.19 | 0.19 | 0.19 | 0.12 | 0.12 | 0.12 |
| Arginine (%) | 1.20 | 1.20 | 1.20 | 1.24 | 1.24 | 1.24 |
| Cystine (%) | 0.29 | 0.29 | 0.29 | 0.28 | 0.28 | 0.28 |
| Histidine (%) | 0.51 | 0.51 | 0.51 | 0.52 | 0.52 | 0.52 |
| Isoleucine (%) | 0.75 | 0.75 | 0.75 | 0.74 | 0.74 | 0.74 |
| Leucine (%) | 1.71 | 1.71 | 1.71 | 1.72 | 1.72 | 1.72 |
| Lysine (%) | 1.10 | 1.10 | 1.10 | I.10 | 1.10 | 1.10 |
| Methionine (%) | 0.56 | 0.56 | 0.56 | 0.57 | 0.57 | 0.57 |
| TSAA (%) | 0.85 | 0.85 | 0.85 | 0.85 | 0.85 | 0.85 |
| Phenylalanine (%) | 0.94 | 0.94 | 0.94 | 0.94 | 0.94 | 0.94 |
| PHE + Tyrosine (%) | 1.50 | 1.50 | 1.50 | 1.51 | 1.51 | 1.51 |
| Threonine (%) | 0.76 | 0.76 | 0.76 | 0.77 | 0.77 | 0.77 |
| Tryptophan (%) | 0.23 | 0.23 | 0.23 | 0.24 | 0.24 | 0.24 |
| Valine (%) | 0.83 | 0.83 | 0.83 | 0.82 | 0.82 | 0.82 |
| Alanine (%) | | | | | | |
| Aspartic Acid (%) | | | | | | |
| Glutamic Acid (%) | | | | | | |
| Glycine (%) | | | | | | |
| Proline (%) | | | | | | |
| Serine (%) | | | | | | |

[1]The first number represents the available P level in the starter diet while the second number represents the available P level for the corresponding grower diet.

TABLE 47

Total cholesterol levels in the thigh and breast meat of broilers when fed different corn and soybean sources, from 0 to 35 days of age.

| Treatments | | | Thigh Meat Total CHL | | Breast Meat Total CHL | |
|---|---|---|---|---|---|---|
| Corn | SBM | Av. Phos. % (as is) | Content mg/100 g wet tissue | Reduction[1] % | Content mg/100 g wet tissue | Reduction[1] % |
| YDC | Check | 0.45/0.40[2] | 145.26a | | 44.66a | |
| YDC | Low4 | 0.45/0.40 | 137.50ab | 5.3 | 39.98b | 10.5 |
| LPC | Check | 0.45/0.40 | 129.67bc | 10.7 | 40.13b | 10.1 |
| LPC | Low4 | 0.45/0.40 | 124.73c | 14.1 | 36.49c | 18.3 |
| | | Statistical Analyses: | | | | |
| | SEM | | 3.05 | | 0.85 | |
| | r[2] | | 0.4205 | | 0.5633 | |
| | Treatment (Pr > F) | | 0.0002 | | 0.0001 | |

[1]Numbers represent the percent decrease in total cholesterol compared to the control to the control treatment (YDC + Check SBM). No statistical analyses were completed on % reduction values.
[2]The first number represents the available P level in the starter diet while the second number represents the available P level for the corresponding grower diet.

Many modifications and other embodiments of the invention will come to mind to one skilled in the art to which this invention pertains having the benefit of the teachings presented in the foregoing descriptions and the associated tables. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of reducing cholesterol in an egg, the method comprising feeding to an egg-laying animal a total animal diet comprising a food source containing an amount of phytate phosphorus sufficiently low for a time sufficient to reduce the cholesterol of said egg, wherein said egg contains at least about 8 percent less total cholesterol as compared to a normal egg.

2. A method according to claim 1, wherein said egg contains at least about 13 percent less total cholesterol as compared to a normal egg.

3. A method according to claim 1, wherein said egg contains at least about 20 percent less total cholesterol as compared to a normal egg.

4. A method according to claim 1, wherein said egg-laying animal is a chicken.

5. A method according to claim 1, wherein said food source is selected from the group consisting of corn, sorghum, barley, wheat, rye, corn, rice, millet, soybeans, products derived from same, and combinations thereof.

6. A method according to claim 1, wherein said food source comprises less than about 0.19 weight percent phytate phosphorus on an as is basis.

7. A method according to claim 1, wherein said food source comprises less than about 0.15 weight percent phytate phosphorus on an as is basis.

8. An egg produced by the method of claim 1.

9. A method of reducing cholesterol in an egg, the method comprising feeding to an egg-laying animal a total animal diet comprising a food source containing an amount of phytate phosphorus sufficiently low for a time sufficient to reduce the cholesterol of said egg, wherein said egg contains at least about 4 percent less low density lipoprotein as compared to a normal egg.

10. A method according to claim 9, wherein said egg contains at least about 15 percent less low density lipoprotein as compared to a normal egg.

11. A method according to claim 9, wherein said egg-laying animal is a chicken.

12. A method according to claim 9, wherein said food source is selected from the group consisting of corn, sorghum, barley, wheat, rye, corn, rice, millet, soybeans, products derived from same, and combinations thereof.

13. A method according to claim 9, wherein said food source comprises less than about 0.19 weight percent phytate phosphorus on an as is basis.

14. A method according to claim 9, wherein said food source comprises less than about 0.15 weight percent phytate phosphorus on an as is basis.

15. An egg produced by the method of claim 9.

16. A method of reducing cholesterol in an egg, the method comprising feeding to an egg-laying animal a total animal diet comprising a food source containing an amount of phytate phosphorus sufficiently low for a time sufficient to reduce the cholesterol of said egg, wherein said egg contains about 5 to about 50 percent less total cholesterol as compared to a normal egg.

17. A method according to claim 16, wherein said egg contains about 5 to about 30 percent less total cholesterol as compared to a normal egg.

18. A method according to claim 16, wherein said egg-laying animal is a chicken.

19. A method according to claim 16, wherein said food source is selected from the group consisting of corn, sorghum, barley, wheat, rye, corn, rice, millet, soybeans, products derived from same, and combinations thereof.

20. A method according to claim 16, wherein said food source comprises less than about 0.19 weight percent phytate phosphorus on an as is basis.

21. A method according to claim 16, wherein said food source comprises less than about 0.15 weight percent phytate phosphorus on an as is basis.

22. An egg produced by the method of claim 16.

23. A method of reducing cholesterol in an egg, the method comprising feeding to an egg-laying animal a total animal diet comprising a low phytate food source selected from the group consisting of low phytate corn, low phytate soybeans, and mixtures thereof, the low phytate food source containing an amount of phytate phosphorus sufficiently low for a time sufficient to reduce the cholesterol of said egg, wherein said egg contains at least about 8 percent less total cholesterol as compared to a normal egg.

24. A method according to claim 23, wherein said egg contains at least about 13 percent less total cholesterol as compared to a normal egg.

25. A method according to claim 23, wherein said egg contains at least about 20 percent less total cholesterol as compared to a normal egg.

26. A method according to claim 23, wherein said low phytate food source is low phytate corn.

27. A method according to claim 26, wherein said egg contains at least about 13 percent less total cholesterol as compared to a normal egg.

28. A method according to claim 26, wherein said egg contains at least about 20 percent less total cholesterol as compared to a normal egg.

29. A method according to claim 26, wherein said total animal diet comprises at least about 30 weight percent of said low phytate corn.

30. A method according to claim 26, wherein said total animal diet comprises at least about 50 weight percent of said low phytate corn.

31. A method according to claim 23, wherein said low phytate food source is low phytate soybeans.

32. A method according to claim 31, wherein said egg contains at least about 13 percent less total cholesterol as compared to a normal egg.

33. A method according to claim 31, wherein said egg contains at least about 20 percent less total cholesterol as compared to a normal egg.

34. A method according to claim 31, wherein said total animal diet comprises at least about 5% by weight of said low phytate soybeans.

35. A method according to claim 31, wherein said total animal diet comprises about 10 to about 55% by weight of said low phytate soybeans.

36. A method of reducing cholesterol in an egg, the method comprising feeding to an egg-laying animal a total animal diet comprising a low phytate food source selected from the group consisting of low phytate corn, low phytate soybeans, and mixtures thereof, the low phytate food source containing an amount of phytate phosphorus sufficiently low for a time sufficient to reduce the cholesterol of said egg, wherein said egg contains at least about 4 percent less low density lipoprotein as compared to a normal egg.

37. A method according to claim 36, wherein said egg contains at least about 15 percent less low density lipoprotein as compared to a normal egg.

38. A method according to claim 36, wherein said low phytate food source is low phytate corn.

39. A method according to claim 38, wherein said egg contains at least about 15 percent less low density lipoprotein as compared to a normal egg.

40. A method according to claim 38, wherein said total animal diet comprises at least about 30 weight percent of said low phytate corn.

41. A method according to claim 38, wherein said total animal diet comprises at least about 50 weight percent of said low phytate corn.

42. A method according to claim 36, wherein said low phytate food source is low phytate soybeans.

43. A method according to claim 42, wherein said egg contains at least about 15 percent less low density lipoprotein as compared to a normal egg.

44. A method according to claim 42, wherein said total animal diet comprises at least about 5% by weight of the low phytate soybeans.

45. A method according to claim 42, wherein said total animal diet comprises about 10 to about 55% by weight of the low phytate soybeans.

46. A method of reducing cholesterol in an egg, the method comprising feeding to an egg-laying animal a total animal diet comprising a low phytate food source selected from the group consisting of low phytate corn, low phytate soybeans, and mixtures thereof, the low phytate food source containing an amount of phytate phosphorus sufficiently low for a time sufficient to reduce the cholesterol of said egg, wherein said egg contains about 5 to about 50 percent less total cholesterol as compared to a normal egg.

47. A method according to claim 46, wherein said egg contains about 5 to about 30 percent less total cholesterol as compared to a normal egg.

48. A method according to claim 46, wherein said low phytate food source is low phytate corn.

49. A method according to claim 48, wherein said egg contains about 5 to about 30 percent less total cholesterol as compared to a normal egg.

50. A method according to claim 48, wherein said total animal diet comprises at least about 30 weight percent of said low phytate corn.

51. A method according to claim 48, wherein said total animal diet comprises at least about 50 weight percent of said low phytate corn.

52. A method according to claim 46, wherein said low phytate food source is low phytate soybeans.

53. A method according to claim 52, wherein said egg contains about 5 to about 30 percent less total cholesterol as compared to a normal egg.

54. A method according to claim 52, wherein said total animal diet comprises at least about 5% by weight of said low phytate soybeans.

55. A method according to claim 52, wherein said total animal diet comprises about 10 to about 55% by weight of said low phytate soybeans.

* * * * *